(12) United States Patent
Nakawatase et al.

(10) Patent No.: US 9,407,653 B2
(45) Date of Patent: Aug. 2, 2016

(54) UNIFIED SCAN MANAGEMENT

(75) Inventors: Ryan Tadashi Nakawatase, Laguna Hills, CA (US); James Michael Hugard, IV, Mission Viejo, CA (US); Sven Schrecker, San Marcos, CA (US)

(73) Assignee: McAfee, Inc., Santa Clara, CA (US)

( * ) Notice: Subject to any disclaimer, the term of this patent is extended or adjusted under 35 U.S.C. 154(b) by 355 days.

(21) Appl. No.: 13/443,176

(22) Filed: Apr. 10, 2012

(65) Prior Publication Data

US 2013/0269028 A1    Oct. 10, 2013

(51) Int. Cl.
| | |
|---|---|
| *G06F 21/00* | (2013.01) |
| *G06F 21/57* | (2013.01) |
| *G06F 12/14* | (2006.01) |
| *H04L 12/24* | (2006.01) |
| *H04L 29/06* | (2006.01) |

(52) U.S. Cl.
CPC .......... *H04L 63/1433* (2013.01); *G06F 21/577* (2013.01); *H04L 63/20* (2013.01)

(58) Field of Classification Search
CPC .......................... H04L 63/1433; H04L 63/145
USPC ...................................................... 726/22–25
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,574,737 B1 * | 6/2003 | Kingsford et al. | 726/25 |
| 6,792,543 B2 | 9/2004 | Pak et al. | |
| 7,152,105 B2 | 12/2006 | McClure et al. | |
| 7,502,939 B2 * | 3/2009 | Radatti | 713/188 |
| 7,506,155 B1 | 3/2009 | Stewart et al. | |
| 7,543,056 B2 | 6/2009 | McClure et al. | |
| 7,712,138 B2 | 5/2010 | Zobel et al. | |
| 8,800,046 B2 | 8/2014 | Nakawatase et al. | |
| 2003/0028803 A1 | 2/2003 | Bunker et al. | |
| 2004/0015728 A1 | 1/2004 | Cole et al. | |
| 2004/0193918 A1 * | 9/2004 | Green et al. | 713/201 |
| 2005/0010821 A1 * | 1/2005 | Cooper et al. | 713/201 |

(Continued)

FOREIGN PATENT DOCUMENTS

| | | |
|---|---|---|
| KR | 20020043994 | 6/2002 |
| KR | 10-2004-041775 A | 5/2004 |
| WO | WO 2004/075006 A2 | 9/2004 |
| WO | WO 2013/155219 A1 | 10/2013 |
| WO | WO 2013/155230 A1 | 10/2013 |

OTHER PUBLICATIONS

International Search Report and Written Opinion mailed Jul. 26, 2013 from International Application No. PCT/US2013/036039, 9 pages.

(Continued)

*Primary Examiner* — Alexander Lagor
(74) *Attorney, Agent, or Firm* — Patent Capital Group

(57) ABSTRACT

A particular scan set to be performed on at least a portion of a computing environment is identified. A particular scan engine, in a plurality of scan engines, is identified that is adapted to perform at least one scan in the particular scan set, each scan engine in the plurality of scan engines adapted to perform one or more scans on one or more host devices in the computing environment. A request is sent to the particular scan engine to perform the at least one scan in the particular scan set and scan result data is received from the particular scan engine corresponding to the at least one scan in the particular scan set.

23 Claims, 17 Drawing Sheets

(56) References Cited

U.S. PATENT DOCUMENTS

| | | |
|---|---|---|
| 2006/0085852 A1 | 4/2006 | Sima |
| 2008/0092237 A1 | 4/2008 | Yoon et al. |
| 2009/0106844 A1 | 4/2009 | Jun et al. |
| 2009/0187992 A1 | 7/2009 | Poston |
| 2010/0043066 A1 | 2/2010 | Miliefsky |
| 2010/0083381 A1 | 4/2010 | Khosravi et al. |
| 2012/0192273 A1* | 7/2012 | Turbin .................... G06F 21/56 726/23 |
| 2013/0269029 A1 | 10/2013 | Nakawatase et al. |

OTHER PUBLICATIONS

USPTO Dec. 9, 2013 Final Rejection from U.S. Appl. No. 13/443,325, 9 pages.

International Search Report and Written Opinion mailed Jun. 17, 2013 from International Application No. PCT/US2013/036025.

U.S. Appl. No. 13/443,325, filed Apr. 10, 2012, entitled, "Unified Scan Engine," Inventor(s) Ryan Tadashi Nakawatase, et al.

International Preliminary Report on Patentability mailed Oct. 14, 2014 from International Application No. PCT/US2013/036025, 6 pages.

International Preliminary Report on Patentability mailed Oct. 14, 2014 from International Application No. PCT/US2013/036039, 6 pages.

Supplementary European Search Report in EP Application No. 13 77 5243, mailed on Sep. 29, 2015, 6 pages.

Supplementary European Search Report in EP Application No. 13 77 6061, mailed on Nov. 11, 2015, 6 pages.

* cited by examiner

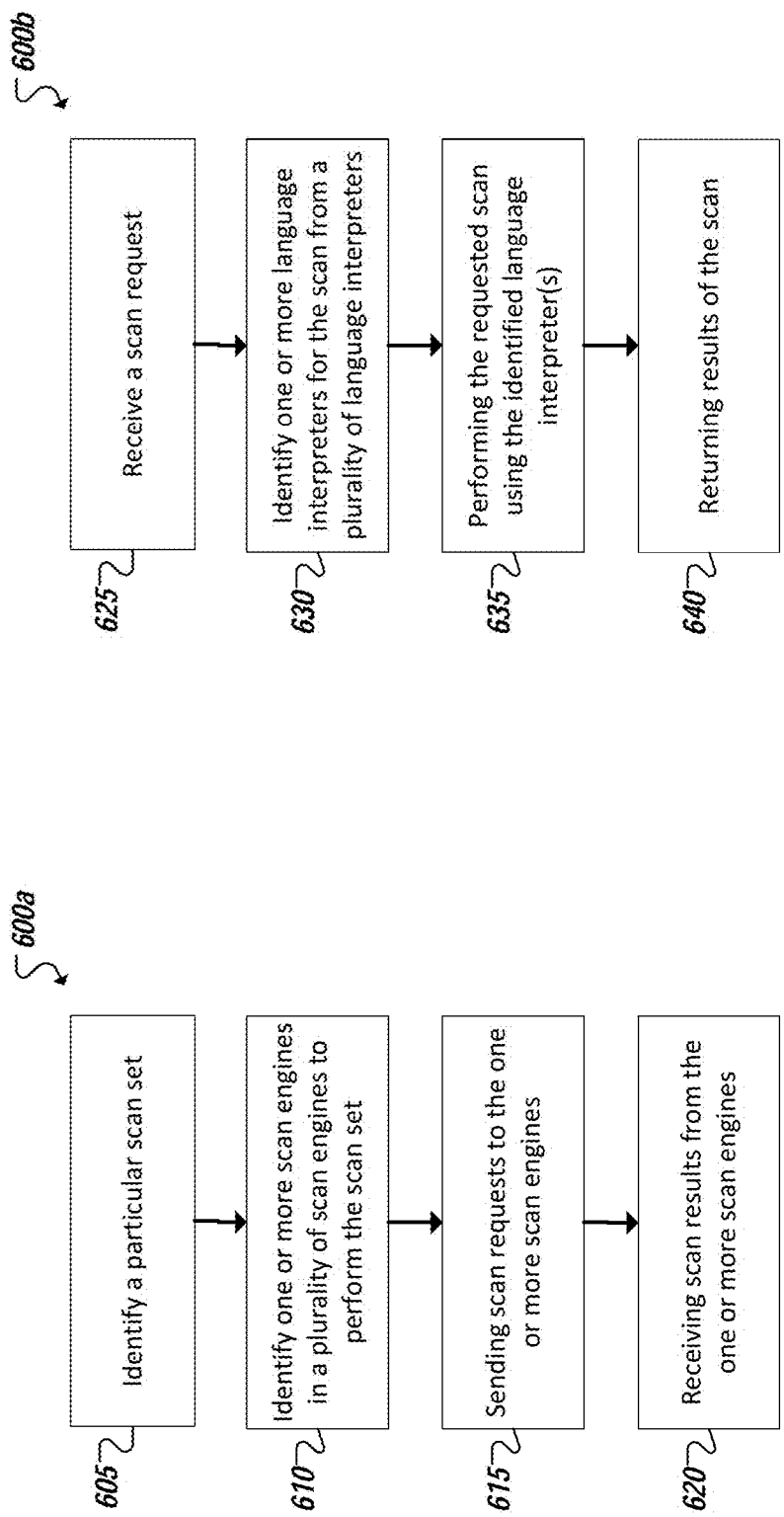

ably represent a vulnerability that can be exploited -->
UNIFIED SCAN MANAGEMENT

TECHNICAL FIELD

This disclosure relates in general to the field of computing security and, more particularly, to security scanning.

BACKGROUND

Modern organizations concern themselves more and more with maintaining the reliability and security of their computing environments given the pivotal role computer networks play in intra-entity and inter-entity communications and transactions. Various tools have been used by network administrators, government, security consultants, and hackers to test the vulnerabilities of target networks, such as, for example, whether any computers on a network can be accessed and controlled remotely without authorization. Some network security tools can test network paths for possible intrusion. From a testing point, simple commands such as traceroute and ping can be used to manually map a network topography, and determine roughly what network addresses are "alive" and which computers are "awake" on the network (i.e., determine which computers are on and are responding to network packets). A tool such as a port scanner can be used to test an individual target computer on the target network to determine what network ports are open. If open ports are found, these ports may provide access for possible intrusion, and potentially represent a vulnerability that can be exploited by a malicious hacker. A variety of tools can be employed within a computing environment resulting in a variety of different test being run and data being returned. Administrators and security analysts can work through returned data, in some cases, from unrelated tools to attempt to synthesize the various results and make sense of the results, generate reports, and so on.

BRIEF DESCRIPTION OF THE DRAWINGS

FIGS. 6A-6B are simplified flowcharts illustrating example techniques for scanning portions of a computing environment in accordance with at least one embodiment.

Like reference numbers and designations in the various drawings indicate like elements.

DETAILED DESCRIPTION OF EXAMPLE EMBODIMENTS

Overview

Figure 1:
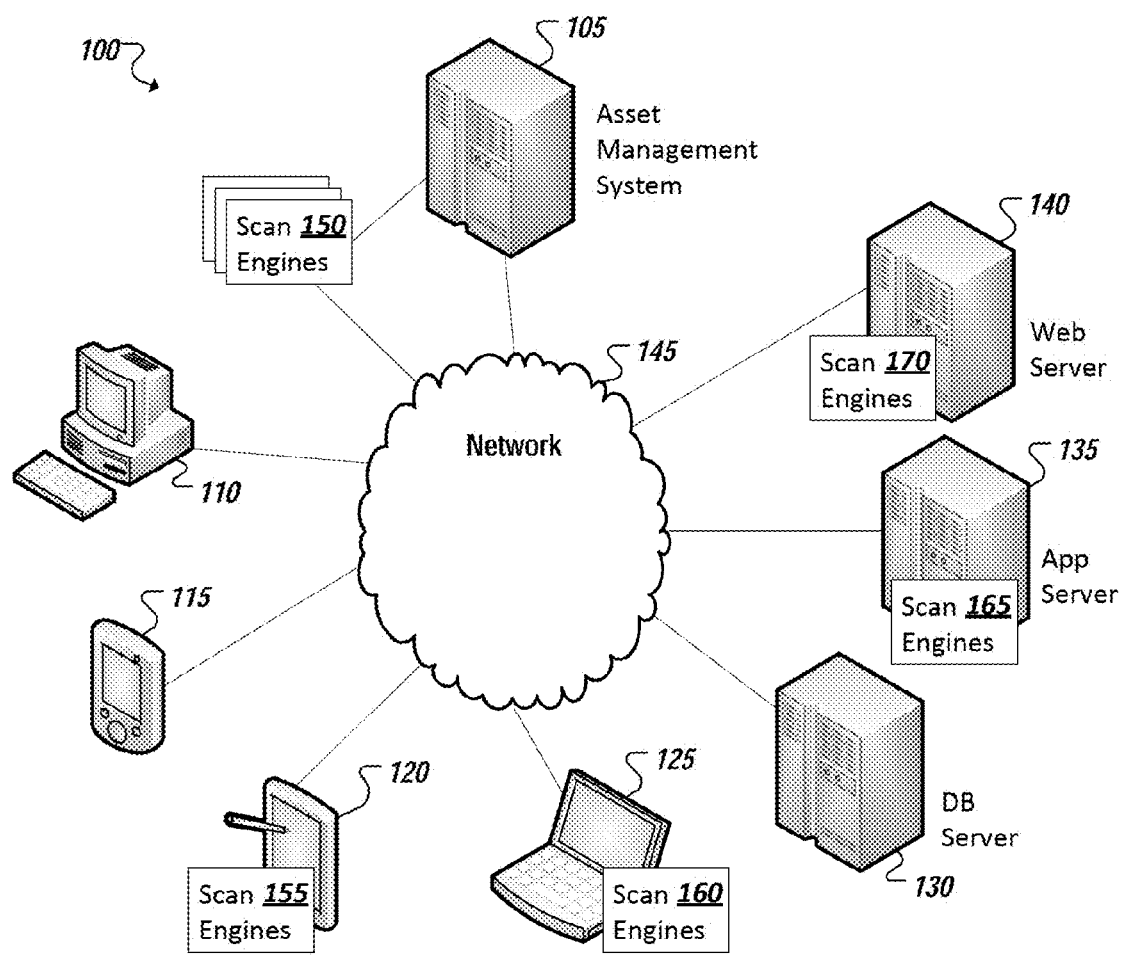
FIG. 1 is a simplified schematic diagram of an example computing system including a plurality of scan engines in accordance with at least one embodiment.

In general, one aspect of the subject matter described in this specification can be embodied in methods that include the actions of identifying a particular scan set to be performed on at least a portion of a computing environment and identifying a particular scan engine, in a plurality of scan engines, adapted to perform at least one scan in the particular scan set. Each scan engine in the plurality of scan engines can be adapted to perform one or more scans on one or more host devices in the computing environment. A request can be sent to the particular scan engine to perform the at least one scan in the particular scan set and scan result data can be received from the particular scan engine corresponding to the at least one scan in the particular scan set.

In another general aspect of the subject matter described in this specification can be embodied in systems that include at least one processor device, at least one memory element, and an asset management system server. The asset management system server can be adapted, when executed by the at least one processor device, to identify a particular scan set to be performed on at least a portion of a computing environment and identify a particular scan engine, in a plurality of scan engines, adapted to perform at least one scan in the particular scan set. The asset management system server can be further adapted to send a request to the particular scan engine to perform the at least one scan in the particular scan set, and receive scan result data from the particular scan engine corresponding to the at least one scan in the particular scan set. Each scan engine in the plurality of scan engines can be adapted to perform one or more scans on one or more host devices in the computing environment.

These and other embodiments can each optionally include one or more of the following features. The request can be sent through an agent. The particular scan engine can be a network-based scan engine adapted to perform external scans of the portion of the computing environment. The particular scan engine can be a host-based scan engine hosted on a particular target device in the portion of the computing environment and adapted to perform internal scans of the particular target device. A particular computing language in a plurality of computing languages can be identified from the request by the particular scan engine, and the scan engine can utilize a corresponding language interpreter in a plurality of language interpreters on the particular scan engine to perform the at least one scan in the particular scan set. The request can cause the particular language interpreter to be activated on the particular scan engine during the at least one scan in the particular scan set. The particular scan set can be based, at least in part, on a security policy of the computing environment applicable to the portion of the computing environment. Identifying the particular scan set can include generating the particular scan set based on the security policy. The security policy can be one of a device-centric policy, an organization-specific policy, and a regulatory policy.

Further, these and other embodiments can also each optionally include one or more of the following features. A second scan engine in the plurality of scan engines can be identified to perform another scan in the particular scan set, and a request can be sent to the second scan engine to perform the other scan in the particular scan set. Scan result data can also be received from the second scan engine corresponding to the other scan in the particular scan set. Received scan result data corresponding to each scan in the particular scan set can be aggregated. The particular scan engine can be a network-based scan engine adapted to perform external scans of the portion of the computing environment and the second scan engine can be a host-based scan engine hosted on a particular target device in the portion of the computing environment and adapted to perform internal scans of the particular target device. The request to the second scan engine to perform the other scan can be sent in response to the scan result data received from the particular scan set corresponding to the at least one scan in the particular scan set. The portion of the computing environment can includes the entire computing environment. The at least one scan can be a first of at least two scans in the particular scan set, and a second scan in the at least two scans and different from the first scan can be identified for the particular scan engine. A request can be sent to the particular scan engine to perform the second scan, and scan result data from the particular scan engine can be received corresponding to the second scan. The second scan can involve a different scan target than the first scan. The second scan can be a different type of scan from the first scan. The second scan can utilize a different computing language than the first scan. A different second scan set can be identified that is to be performed on at least a portion of the computing environment, one or more scan engines in the plurality of scan engines can be identified to perform scans in the second scan set, request to perform the scans in the second scan set can be sent to the identified scan engines, and scan results data for the second scan set can be received. The particular scan engine can be perform scans in each of the particular and second scan sets. Each scan engine in the plurality of scan engines can be a unified scan engine adapted to make use of a respective library of language interpreters included on the respective scan engine.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 is a simplified block diagram illustrating an example implementation of a computing environment 100 including an asset management system 105 and a plurality of computing devices, including user computing devices 110, 115, 120, 125, and other host devices (e.g., 130, 135, 140), including devices serving various services, data, applications, and other resources within the computing environment. The computing environment 100 can additionally include a plurality of scan engines 150, 155, 160, 165, 170 adapted to perform a variety of tests, probes, access attempts and other scans according to one or more of a variety of scan scripts, each adapted to attempt to obtain information regarding attributes of the various elements of the computing environment 100, its respective host devices (e.g., 110, 115, 120, 125, 130, 135, 140), applications and services hosted by the devices, and networks (e.g., 145) within the computing environment 100, as well as individual network elements, such as routers, switches, firewalls, etc. Further, in some implementations, scan engines 150, 155, 160, 165, 170 can scan system components to additionally obtain information describing attributes of various users/persons using the computing environment 100, as well as behavioral tendencies of the users/persons. Data generated, discovered, and/or collected by scan engines 150, 155, 160, 165, 170 through various scans of the computing environment can be aggregated, synthesized, and otherwise processed in connection with security-related assessments of the computing environment 100, or particular portions, or elements, of the computing environment.

An example asset management system 105, in some implementations, can at least partially centralize control of scans performed by scan engines 150, 155, 160, 165, 170 as well as the processing of scan result data obtained from the scans. In many traditional systems, multiple different scanning utilities can be provided independent of the others, each scanning tool adapted to provide a particular type of scanning service, such as the scanning of a particular type of sub-system or device, scanning for particular attributes, etc. In some instances, however, multi-dimensional scans can involve tests and scans of a variety of different services and devices and involve the invocation of multiple different scanning utilities. Each scanning utility, in typical systems, would scan its particular subset of the computing environment independent of other scanning utilities, in some cases performing redundant checks, scans, or redundantly scanning a particular device or service. Additionally, each independent scanning utility would return its own result data set, with a multi-dimensional scan (e.g., scanning project involving multiple different scans and scan utilities) producing a corresponding set of multiple, independent result sets. Synthesizing and making sense of the various result sets, including potentially redundant or inconsistent results, can involve human administrators sifting and filtering through the various scan results to generate conclusions, produce reports, and derive meaning from the scan, among other difficulties and inefficiencies. An asset management system and scan engines implemented in accordance with at least some of the principles described herein can, in some cases, overcome these deficiencies, as well as others not explicitly described herein.

Endpoint or user devices, network elements, host devices, and other computing devices included in a computing environment 100 can communicate with and/or facilitate communication between other devices over one or more networks (e.g., 145). Vulnerabilities and threats can materialize from devices' participation in computing transactions and communications both inside and outside the computing environment 100. The presence of various vulnerabilities within a system can open the door to the computing environment 100 being harmed by threats exploiting the vulnerabilities, including computer viruses, compromised data, unauthorized system, data, or network access, data theft, worms, malware, hacks, and other threats. Such vulnerabilities and threats can pose risks to one or more devices, sub-networks, or the computing environment itself. Additionally, various policies under which the computing environment is governed can additionally mandate particular compliance with one or more policies by the computing environment. Efficiently and accurately scanning devices and networks within the computing environment 100 can assist in ensuring various security standards and policies are upheld, and that the security and health of the overall computing environment 100 and its constituent elements are maintained.

In general, "servers," "clients," "computing devices," "network elements," "hosts," and "systems," including computing devices in example computing environment 100 (e.g., 105, 110, 115, 120, 125, 130, 135, 140, etc.), can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of devices, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 125, 130, 135, 140, etc.) can each include one or more processors, computer-readable memory, and one or more interfaces, among other features and hardware. Servers can include any suitable software component or module, or computing device(s) capable of hosting and/or serving software applications and services (e.g., the asset management system 105, scan engines 150, 155, 160, 165, 170, and others services, applications, and other programs including distributed, enterprise, or cloud-based software applications, data, and services. For instance, servers can be configured to host, serve, or otherwise manage data structures, models, data sets, software services and applications interfacing, coordinating with, or dependent on or used by other services and devices. In some instances, a server, system, subsystem, or computing device can be implemented as some combination of devices that can be hosted on a common computing system, server, server pool, or cloud computing environment and share computing resources, including shared memory, processors, and interfaces.

User, endpoint, or client computing devices (e.g., 110, 115, 120, 125, etc.) can include traditional and mobile computing devices, including personal computers, laptop computers, tablet computers, smartphones, personal digital assistants, feature phones, handheld video game consoles, desktop computers, internet-enabled televisions, and other devices designed to interface with human users and capable of communicating with other devices over one or more networks (e.g., 145). Attributes of user computing devices, and computing device generally (e.g., 105, 110, 115, 120, 125, 130, 135, 140, etc.), can vary widely from device to device, including the respective operating systems and collections of software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices.

Some computing devices can further include at least one graphical display device and user interfaces allowing a user to view and interact with graphical user interfaces of applications and other programs provided in computing environment 100, including user interfaces and graphical representations of programs interacting with applications hosted within the computing devices as well as graphical user interfaces associated with an asset management system 105, or one or more scan engines 150, 155, 160, 165, 170). Moreover, while user computing devices (e.g., 110, 115, 120, 125, etc.) may be described in terms of being used by one user, this disclosure contemplates that many users may use one computer or that one user may use multiple computers.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
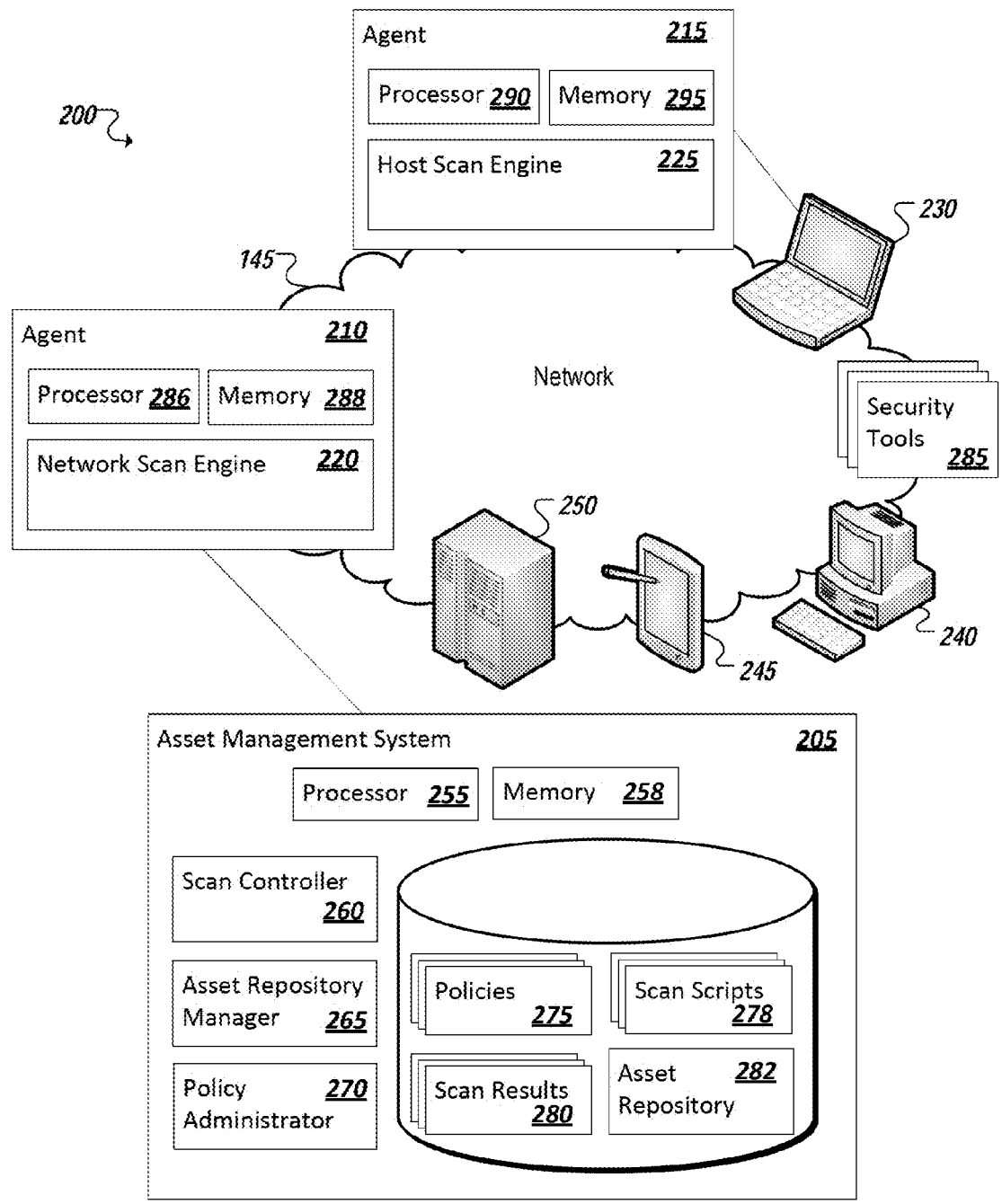
FIG. 2 is a simplified block diagram of an example computing system including an example asset management system and example scan engines in accordance with at least one embodiment.

FIG. 2 is a simplified block diagram 200 illustrating an example system including an example asset management system 205 operating cooperatively with a plurality of agents (e.g., 210, 215) equipped with scan engines (e.g., 220, 225) adapted to either perform host-based (e.g., in the case of scan engine 225) or network-based scans (e.g., in the case of scan engine 220), based on instructions and requests received from asset management system 205. Scan results can be generated from scans using network- and host-based scan engines (e.g., 220, 225 respectively) and sent to asset management system 205 for centralized management, analysis, and processing. In some cases, asset management system 205 can orchestrate scans involving many scans (i.e., a set of scans) by multiple different scan engines, including both network- and host-based scan engines, and can adapt scan scripts used by the scan engines based on scan results received during one or more portions of the scan set. Further, the result data obtained or generated using one or more different scan engines can be centrally reported to asset management system for aggregation, synthesis, and analysis by the asset management system.

An example asset management system 205 can include one or more processor devices 255 and memory elements 258 used to execute functionality included, in some implementations, in one or more components of the asset management system 205. For instance, in one example implementation of an asset management system 205, a scan controller 260, asset repository manager 265, and policy administrator 270 can be provided. An example scan controller 260, for instance, can include functionality for interfacing with one or more scan engines (e.g., 220, 225) and managing scan sets and individual scans performed by the scan engines. In some instances, policies (e.g., 275) can be associated with one or more components of a computing environment, such as the entire environment, a network, one or more subnets, one or more devices, one or more applications, one or more users, etc. Such policies can include user-centric policies (e.g., applied against a particular user's use of devices and networks of the computing environment), device-centric policies (e.g., applied against particular devices within the computing environment), organization-specific policies (e.g., policies set by an organization governing uses and configurations within a particular organization's computing environment), and regulatory policies (e.g., policies set by industry, government, or other entities setting system requirements and guidelines of computing systems used within particular contexts governed by the entity (e.g., Sarbanes-Oxley system compliance policies, Payment Card Industry (PCI) policies, Health Insurance Portability and Accountability Act (HIPAA) policies, etc.)), among other examples. A scan controller 260 can be adapted to generate particular scans, including sets of scans that involve a sequence of a scans, performed, in some cases, by a plurality of different scan engines (e.g., 220, 225), addressing compliance with or guidelines of a particular policy (e.g., 275). A variety of scan scripts 278 can be generated and maintained using scan controller 260 for use in performing scans in connection with one or more policies 274.

Scan scripts 278 can be pushed by a scan controller 260 to one or more particular scan engines 220, 225, for use by the scan engines in performing corresponding scan tasks. A scan script 278 can include executable instructions that, when read or executed by the scan engine, identify particular scan targets, the scans to be performed, as well as, in some instances, the type of computing language to be used by the scan engine in performing the scan task. Execution of a scan script can cause a scan engine to perform one or more scan tasks (e.g., utilizing one or more language interpreters). In some instances, a scan can involve the collection of data from a particular device or application within the computing environment. A scan can include an attempt (authorized or unauthorized from the perspective of the target) to access particular resources of a target computing device or application. A scan can include monitoring the response of a particular device or application within the computing environment to particular stimuli or data sent to the computing device or application. Indeed, a scan can include the generation of data by a scan engine to be provided as inputs to, communicated to, or otherwise sent to a target of the scan, the scan engine further monitoring the response of the scan target to the sent data. Such data, sent by the scan engine, can be based on a particular scan script 278 received from the scan controller 260 and be in the computing language(s) in which the data is to be generated and sent within the scan. Further, data returned from a target can be interpreted using one or more language interpreters of the scan engine to generate scan result data describing the responses of the target and other results of the scan.

A scan controller 260 can further interface with scan engines (e.g., 210, 215) to obtain scan result data returned from scan tasks performed by the scan engines. Further, a scan controller 260, in some implementations, can organize and aggregate scan result data (e.g., 280) in accordance with particular goals of the scan (e.g., measuring compliance with a particular security policy upon which the scan(s) is based, etc.). Further, a scan controller 260 can process scan result data to determine that desired information has been obtained from the scan or to determine that a particular type of scan was unsuccessful in obtaining particular information desired for a particular scan or set of scans, such as information to determine compliance with a particular security policy upon which the scans are based, among other examples. In such instances, a scan controller 260 can adapt a scan by cancelling a scan prematurely, replacing a scan script with another scan script, sending supplemental scan scripts to a scan engine, invoking another scan on another scan engine, among other examples to control the progress of the scan, among other examples.

In addition to adapting scans based on scan results obtained from previous or ongoing scans, scan controllers 260 can also identify particular scan engines adapted to perform particular scans. For instance, a scan controller 260 can determine that one or more host-based scan engines (e.g., 225) should be used for a particular scan. In other instances, the scan controller 260 can determine that one or more network-based scan engines (e.g., 220) should be used. In the case of network-based scan engines, a scan controller 260 may additionally determine whether a particular network-based scan engine is capable of communicating with and thereby scanning a particular remote scan target (e.g., computing devices 230, 240, 245, 250). Such a determination could include determining whether the particular scan engine is on the same network as the scan target or is otherwise able to interface with the remote scan target. For instance, in some implementations, a scan controller 260 can identify from a mapping of scan targets to scan engines (i.e., identifying which scan controllers are capable of communicating with which scan targets) that a particular network-based scan engine is adapted to communicate with the scan target. If the scan controller 260 further determines that the mapped scan engine is able to perform a particular desired scan on the scan target, the scan controller 260 can forward the scan engine (e.g., 220) a scan script (e.g., 278) for use by the scan engine in scanning the scan target (e.g., computing device 240) over one or more networks (e.g., 145).

In some instances, a mapping of scan engines to scan targets can be maintained in connection with an asset repository 282 cataloguing system assets within the computing environment. System assets can include networks, applications and other programs, individual devices or sub-systems within the computing environment, particular users or persons identified as using the computing environment, etc. The asset repository 282 can further catalogue identified attributes of the various system assets, for instance, to assist in identifying vulnerabilities of the system entities. Information included in the asset repository 282 can also be accessed by scan controller 260 to inform how to perform particular scans on particular scan targets (i.e., system assets to be scanned), which scan targets to scan, which scan engines to invoke to scan particular scan targets, attributes of the scan target to consider, etc. Additionally, scanning of particular system assets can result in the discovery of additional information and attributes of the system asset. Such information can be added to or replace other information for respective system assets documented in the asset repository, for instance, by an asset repository manager 265 operating in communication with a scan controller 260, among other example implementations. In some implementations, an asset repository manager 265 can include functionality for building, updating, and otherwise maintaining an asset repository 282 including records describing system assets discovered within the computing environment.

In addition to scan controller 260 and an asset repository manager 265, asset management system 205 can further include a policy administrator 270 that can be used to define and apply security policies to system assets identified and catalogued in asset repository 282. A library of security policies 275 can be maintained and accessed using policy administrator 270. In some implementations, security policies 275 can include standard security policies (e.g., generally applicable across computing environments), as well as environment-specific security policies. Indeed, in some examples, policy administrator 270 can include functionality allowing administrator users to define and generate new, customized security policies for their respective computing environments. Further, a policy administrator 270 can associate, either from user-entered associations or automated associations (e.g., rule-based policy assignments based on attributes of a respective system asset recorded in asset repository 282) which policies 275 apply to which system entities. Such associations can also be considered by scan controller 260 to identify the portion of the computing environment (e.g., particular scan target devices, a particular sub-network, etc.) to be scanned in a scan or scan set corresponding to enforcement or auditing of a particular policy 275, among other examples.

Information gleaned from scans (e.g., by scan engines 220, 225 controlled by asset management system 205) can be used to enforce particular security policies against particular system assets. For instance, policy administrator 270 and/or asset repository manager 265 can be used to interface with a variety of security tools (e.g., 285) deployed within the computing environment. Security tools 285 can be deployed remote from system assets (e.g., 230, 235, 240) allowing for policy enforcement to take place remote from and behalf of the target (i.e., target of a security enforcement action by one or more of security tools 285), allowing security enforcement without the policy (or enforcement tool) being pushed to the target itself. This can be useful, for instance, in the security enforcement of mobile devices that move on and off of a monitored network, as well as unmanaged devices, such as mobile devices, guest devices, as well as other devices not including agents or other local security tools capable enforcing important security policies. Such security tools 285 can include, for example, firewalls, web gateways, mail gateways, host intrusion protection (HIP) tools, network intrusion protection (NIP) tools, anti-malware tools, data loss prevention (DLP) tools, system vulnerability managers, system policy compliance managers, asset criticality tools, intrusion detection systems (IDS), intrusion protection systems (IPS), and/or a security information management (SIM) tool, among other examples Nonetheless, local security enforcement is also possible, for instance, through agents (e.g., 215) or other tools running, loaded, or otherwise interfacing directly with a target device and providing asset management system 205 with an interface for enforcing policy directly at the target device, among other examples.

Figure 3A:
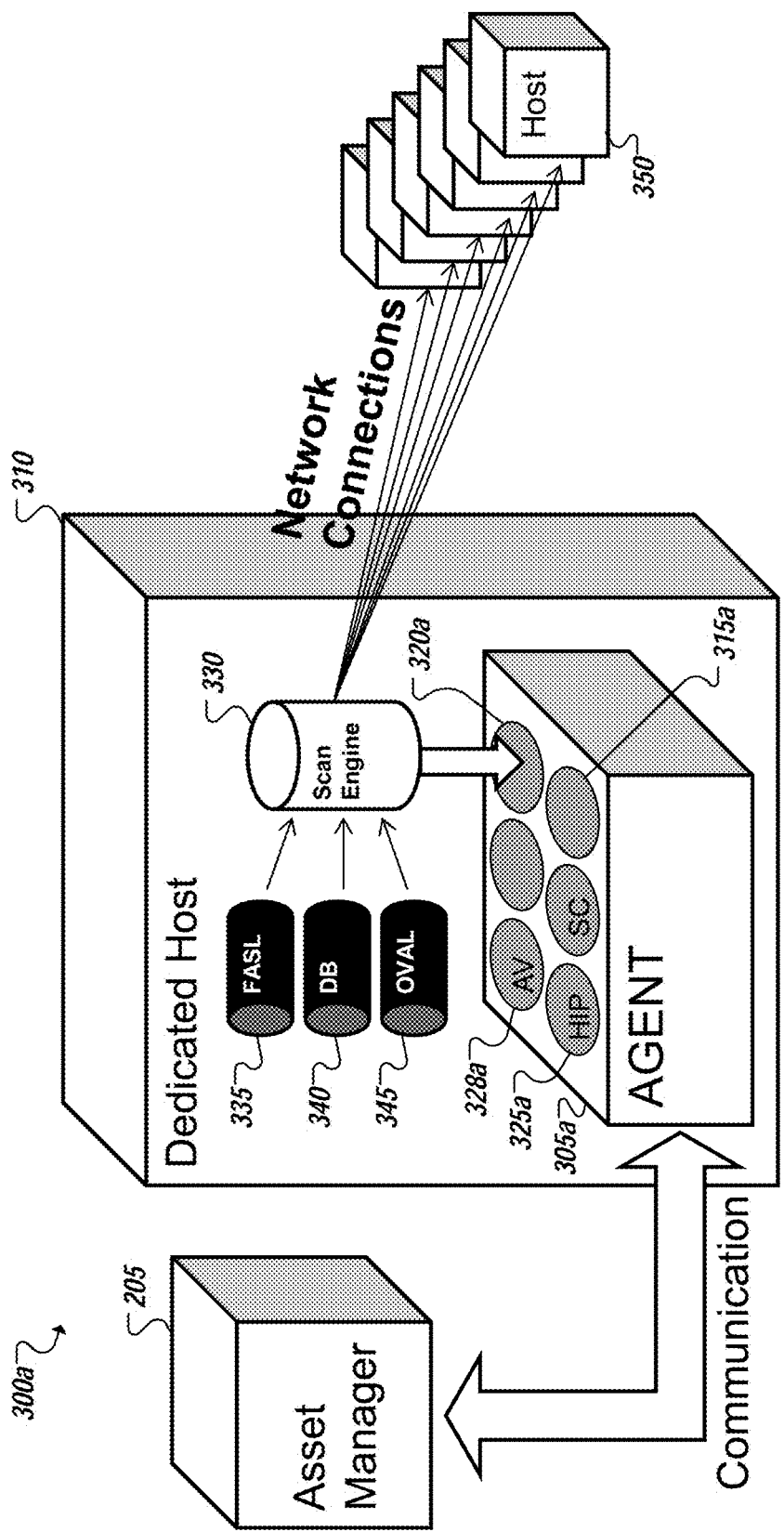
FIGS. 3A-3B are simplified block diagrams of example implementations of agent-based scan engines in accordance with at least one embodiment.
Figure 3B:
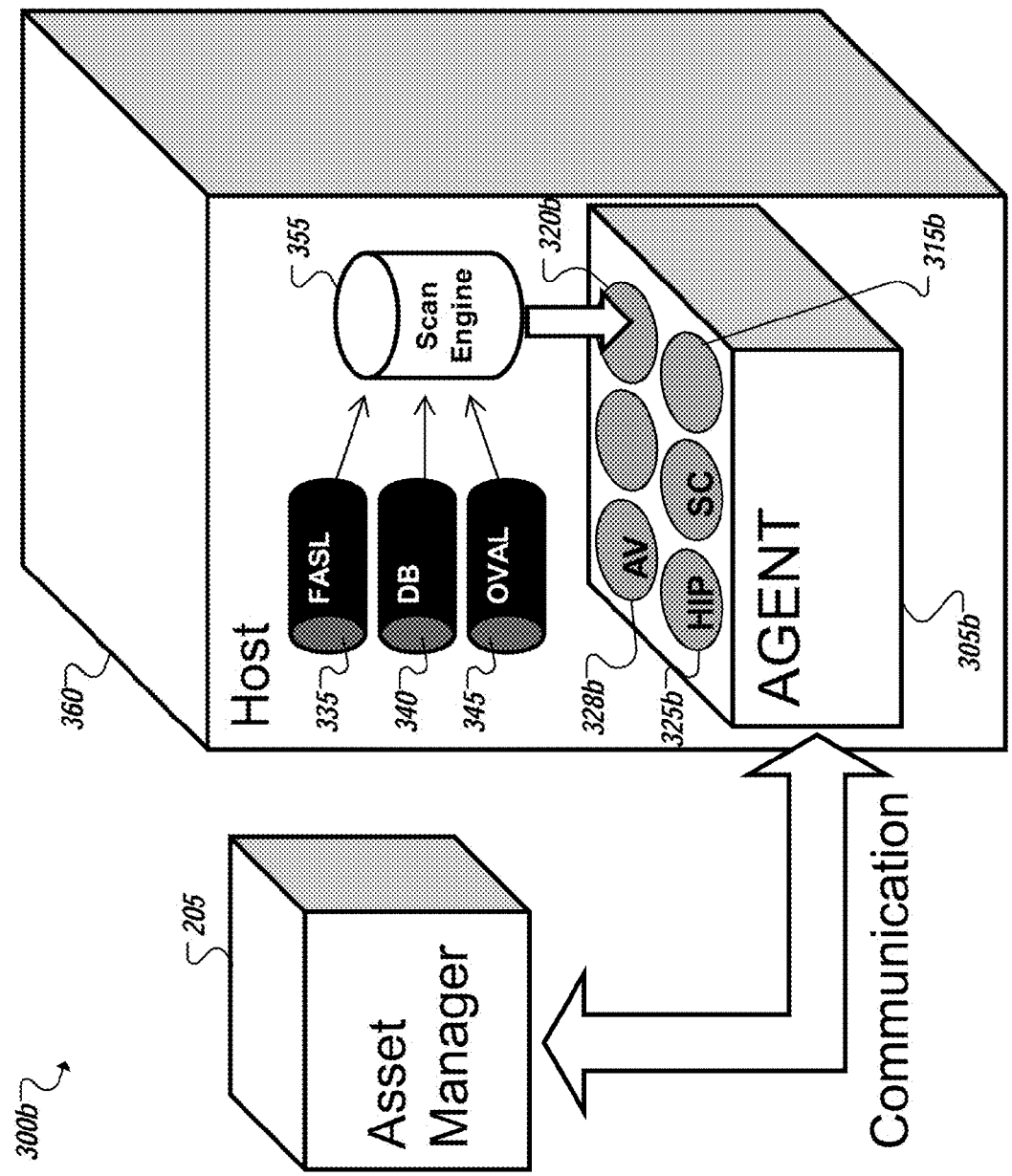

Turning to FIGS. 3A-3B, simplified block diagrams 300*a-b* are shown of example unified scan engine deployments, in accordance with at least some embodiments. For instance, as shown in the particular example implementation illustrated in FIG. 3A, an agent 305*a* is shown hosted on host device 310, the agent facilitating communication with an asset management system 205. In this particular example, agent 305*a* can include "slots" (e.g., 315, 320), or interfaces, permitting pluggable tools and system to be included on and invoked from agent 305*a* to make use of agent 305*a* in communicating with asset management system 205. For instance, in the particular example of agent 305*a*, a HIP module (e.g., 325) is connected, or "plugged" into the agent 305*a*, allowing the HIP tool 325 to be controlled by and/or communicate with asset management system 205 through agent 305*a*. Additional pluggable components, tools, or "plug-ins" can also be included on agent 305*a*, indeed, a single agent (e.g., 305*a*) can include multiple pluggable components, such as, in this example, an antivirus component (AV) 328*a*, among others.

Further, a unified scan engine module (e.g., 330) can be plugged-into an agent 305*a* adapted to communicate and interface with asset management system 205. The unified scan engine 330 can be adapted to provide a variety of different scan functions for use in scans directed using asset management system 205. For instance, in the particular example of FIG. 3A, unified scan engine 330 is a network-based scan engine adapted to perform external scan tasks in connection with scanning remote scan targets. A network-based scan engine (e.g., 330) can provide an external view of a scan target (e.g., from the perspective of other system assets, including malicious devices, applications, and users) by, for instance, simulating a device, network, or other system asset outside of the target and monitoring the scan target's response to the simulated outside system asset. Attributes that are discoverable using a network-based scan engine can include open ports of the device, exploitable web interfaces, IP address, MAC address, hostname, netbios, operating system, hardware profile, hosted applications and services, among other attributes of the device. Accordingly, a network-based unified scan engine 330 can be further adapted to communicate over one or more networks with host devices (i.e., potential scan targets) located remote from the host device 310 hosting the agent 305*a* on which the pluggable unified scan engine 330 is included.

A unified scan engine 330 can further include a library of computer language interpreters (e.g., 335, 340, 345), with each language interpreter providing the unified scan engine 330 the ability to communicate with, send test packets to, and otherwise scan a variety of different types of targets according to a variety of different computing languages. In some instances, the difference between two different, scans can be the computing language(s) in which data is communicated between the scan engine and its target. For instance, the basic scan tasks performed by two different types of scan engines can be substantially similar, with the core difference between the engines being computing language used in the scan tasks. By including an extensive library of language interpreters, a unified scan engine 330, based on the scan it is to run, can utilize the base scanning functionality provided in the unified scan engine in combination with one or more activated language interpreters to convert particular scan instructions (e.g., a scan script) into a language-specific scan that is further able to receive and translate responses from the target in one of the activated languages. As an example, a database language interpreter 340 can be adapted to transform scan instructions into data, arguments, packets, and other communications in a computing language (e.g., structured query language (SQL), XQuery language (XQL), Enterprise Java Beans query language (EJB QL), among others) a particular target database or database management system can make sense of. Through the use of an appropriate language interpreter (e.g., 340), the target database system can thereby make sense of the "pings" and other transmissions sent by the scan engine 330, process them, and respond to them, thereby (hopefully) revealing particular attributes, including vulnerabilities, of the target database system to the scan engine 330. In this way, a single scan engine 330 can be provided that can perform a wide variety of, in some cases, specialized scans, using any one of a library of available language interpreters (e.g., 335, 340, 345) available on the unified scan engine 330. Further, it should be appreciated, that the library of language interpreters can be expanded as new targets and scans are identified and/or made available, thereby allowing the functionality of each unified scan engine to be expansible.

While unified scan engine 330 is shown, in the particular example of FIG. 3A, to be a pluggable scan engine module adapted for operation with a particular agent (e.g., 305*a*) adapted to accept such modules, it should be appreciated that in other implementations, a unified scan engine can be provided that is independent of an agent or other tools. Indeed, in other examples, a unified scan engine can include additional functionality allowing the scan engine to receive scan requests from and communicate scan results to an asset management system without an agent. Implementing an agent-based approach, however, can introduce benefits in some instances, such as providing a standardized platform for multiple different tools and engines (e.g., HIP module 325*a*, AV module 328*a*, unified scan engine 330, etc.) for interface with an at least partially centralized asset management system (e.g., 205). Indeed, a standardized agent platform (e.g., agent 305*a*) can be used to implement a variety of different configurations and combinations of tools on various hosts within a computing environment. For instance, in some examples, a host-based unified scan engine can be implemented in addition to or instead of a network-based scan engine 330 on the same agent 305*a*.

Indeed, turning to FIG. 3B, an example is shown including a second instance of a standardized asset management system agent 305*b* also adapted to be outfitted with a plurality of pluggable components, including example unified scan engine components (e.g., 355). In the example of FIG. 3B, however, rather than accepting a network-based scan engine adapted to scan (multiple) remote targets, a unified host-based scan engine 355 is shown on agent 305b that is adapted to scan a particular device or system locally and internally (i.e. providing an internal view of the target (i.e., the host-based scan engine's own host 360)). In some instances, both a host-based unified scan engine and a network-based unified scan engine could be provided on the same agent on the same host (e.g., to provide for network-based scanning as well as scanning of the host of the network-based scan engine itself), or a third type of unified scan engine can be provided on standardized agent 305a, 305b incorporating both network-based and host-based scanning functionality in connection with a library of language interpreters (e.g., 335, 340, 345) on the same scan engine component, thereby providing a unified scan engine capable of performing potentially any scan (e.g., based on scan scripts received from asset management system 205).

A unified scan engine (e.g., 355) possessing host-based scanning capabilities, can include functionality for accessing, querying, and testing various internal resources also hosted or used by the respective host (e.g., 360), but not accessible to network-based scan engines attempting to infiltrate or expose the host's attributes from the outside. For instance, a host-based scan engine can be used to scan passwords and other internal data (e.g., to assure their encryption), such as address information, services, registry settings, netbios name, and other attributes of the host. Like a network-based unified scan engine (e.g., 330), a host-based scan engine can also be capable of performing a wide variety of scans, utilizing its host-based data mining, data access, and other data scanning functionality in connection with one or more language interpreters (e.g., 335, 340, 345) in a library of available language interpreters. Such scans can cause the host-based scan engine to communicate with a variety of different data structures (e.g., internal databases), tools, programs, and other resources hosted on the local host (e.g., 360) and collect information describing such resources. In some implementations, a common library of language interpreters can be used to provision both network-based and host-based unified scan engines. Language interpreters can be provided to include such languages as Foundstone Assessment Scripting Language (FASL), Scan Alert Scripting Language (SASL), Web Assessment Scripting Language (WASL), shell scripts, Open Vulnerability Assessment Language (OVAL), Network Assessment Script Language (NASL), adaptations of Python, Perl, JavaScript, Ruby, Lua, Java, C++, or any other computer language extended with the ability to communicate with and access open network services on a remote target computer, or extended with the ability to interrogate a local target computer, among other examples.

Upon concluding a scan (or performing particular tasks of the scan) and generating scan results for the scan, a unified host-based scan engine 355 can also interface with an asset management system 205 and communicate the scan results to the asset management system 205. Additionally, as with unified network-based scan engines (e.g., 330), a unified host-based scan engine 355 can also interface with an asset management system 205 to obtain scan requests, scan scripts, and other direction from the asset management system 205 managing the scanning of a particular computing environment. Indeed, in some implementations, a unified host-based scan engine 355 can be adapted to plug-in to an agent instance (e.g., 305b) of a standardized agent platform (e.g., using plug 320b) to provide this interface with a corresponding asset management system 205. In such implementations, instances of a standardized agent (e.g., 305a, 305b) can be loaded or installed onto a variety of different hosts, including hosts of differing types, operating systems, and configurations, to provide a unified platform for allowing an at least partially centralized asset management system 205 to direct security-related scans and security policy enforcement on a computing environment. Indeed, as shown in the examples of FIGS. 3A and 3B, two instances of a standardized agent can be included on two different hosts 310, 360 and be provisioned with two different sets of plug-ins, including two different types of unified scan engines (e.g., network-based and host-based) each making use of an extensible language interpreter library allowing each unified scan engine to dynamically and flexibly perform a wide variety of different scans, simplifying scanning control by the asset management system (e.g., in that the asset management system simply identifies an instance of a host-based or network-based unified scan engine including a library of scan interpreters (e.g., 335, 340, 345)), among other examples.

Turning to the examples of FIGS. 4A-4E, simplified block diagrams 400a-e are shown illustrating example operations including an example asset management system 205 and a plurality of agent-based scan engines (e.g., scan engines 415, 440, 445 on agents 405, 420, 425) involving the scanning of a particular computing environment including computing devices 430, 435, 450 and network 145. In this particular example, asset management system 205 identifies a particular scan (or set of a plurality of scans) to be performed on a portion of the computing environment including one or more devices within the computing environment. The asset management system 205 can identify the scan to be performed based on a request by a user, according to an automated scan schedule, automatically according to one or more security policies for the computing environment, etc. In this particular example, the particular scan to be performed attempts to obtain a desired set of information for the computing environment from one or more network-based scans (e.g., using network-based scan engine 415 hosted on scan engine host 410). Accordingly, asset management system 205 can begin a scan by sending a scan request 455 to scan engine host 410 and agent 405 installed on the scan engine host 405. The scan request can be communicated through the agent 405, such as a standardized agent (e.g., installed on each of hosts 410, 430, 435), to the network-based scan engine 415.

Figure 4A:
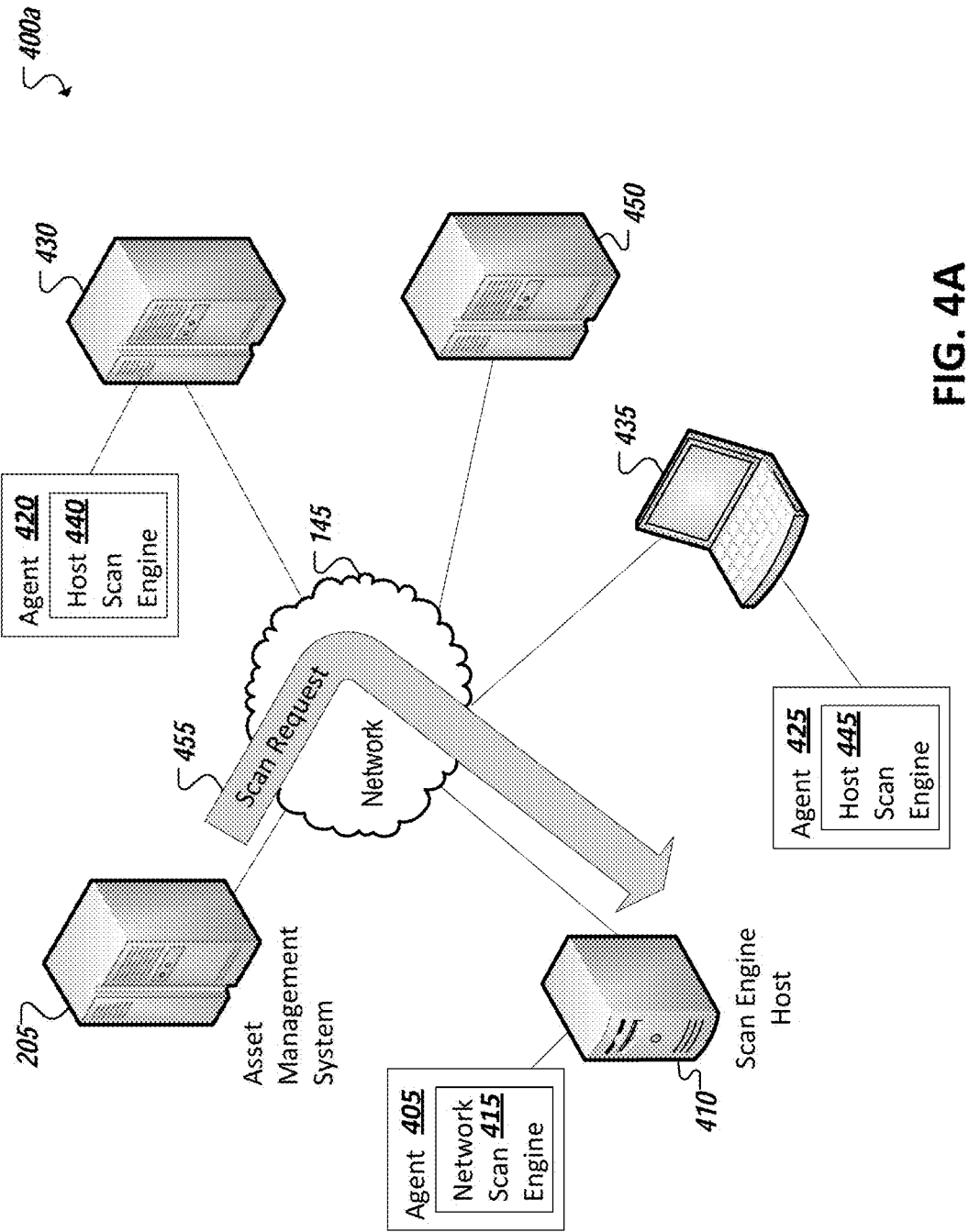
FIGS. 4A-4E are simplified block diagrams illustrating example operations of an example asset management system and example scan engines in accordance with at least one embodiment.
Figure 4B:
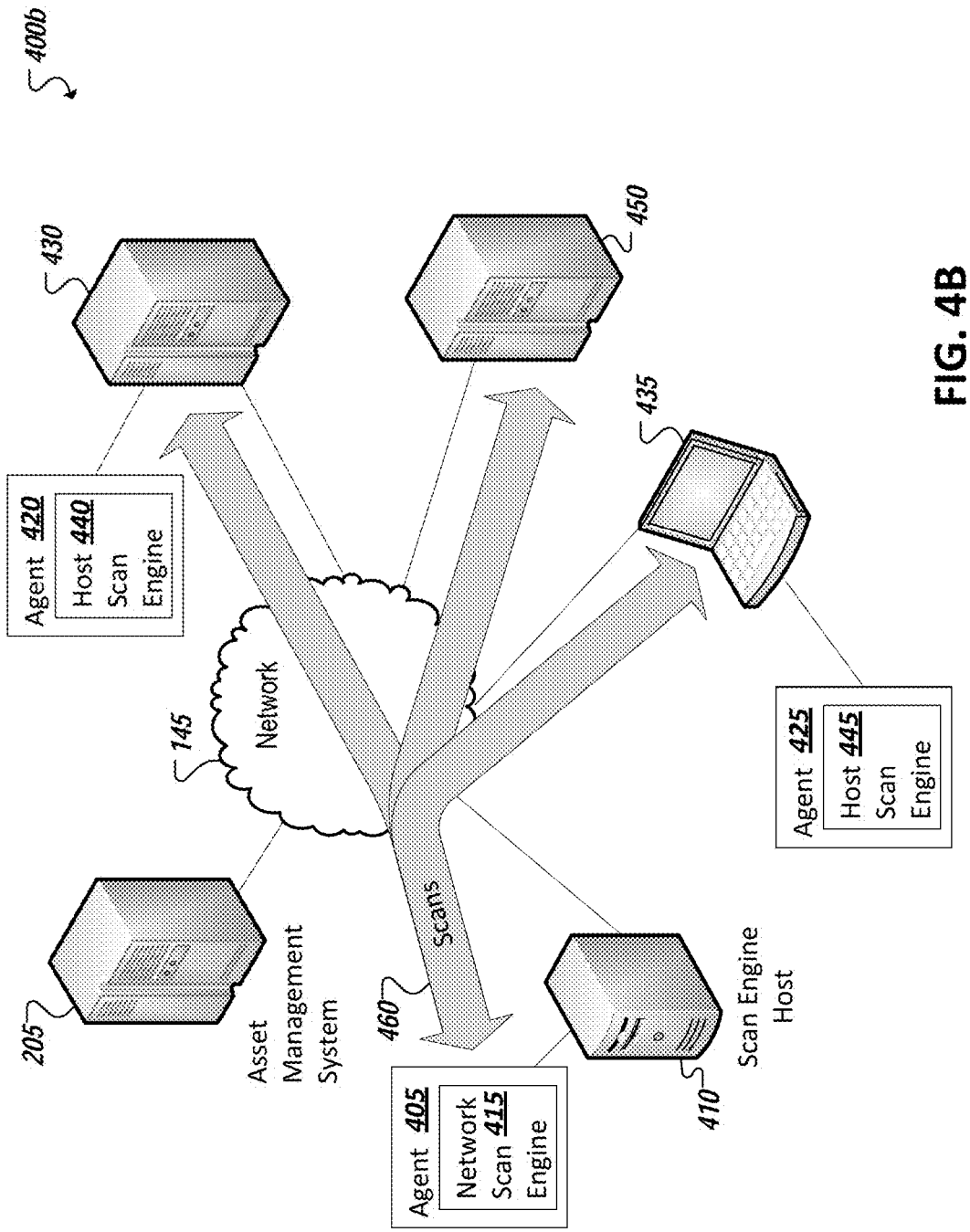
Figure 4C:
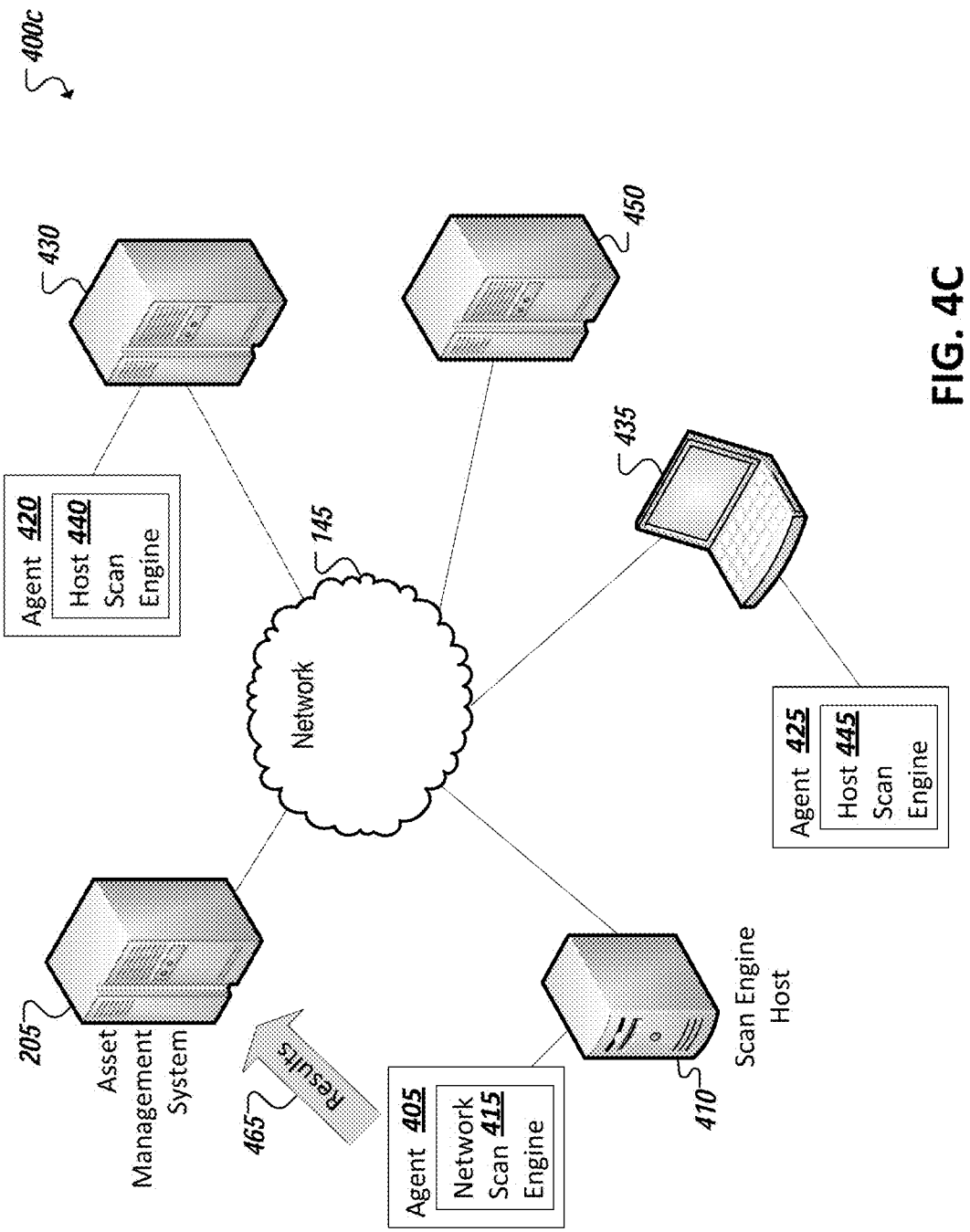

Continuing with the previous example, and turning to FIG. 4B, network scans 460 can be conducted by network-based scan engine 415 (e.g., over network 145) in response to the received scan request 455 from asset management system 205. In some instances, a network-based scan engine 415 may scan a single device in the computing environment, in other instances, such as in the example of FIG. 4B, network scan engine 415 can perform multiple scans of multiple different devices (e.g., 430, 435, 450) in the computing environment in accordance with the scan request received from the asset management system 205. Data can be intercepted, communicated, accessed, or otherwise retrieved by network-based scan engine 415 through the scans 460. Further, as shown in FIG. 4C, information and data obtained by network-based scan engine 415 from the scans 460 of hosts 430, 435, 450 can be communicated (e.g., at 465) to asset management system 205 for processing and/or reporting using the asset management system 205.

In addition to network-based scans, an asset management system 205 can determine that a particular scan or set of scans (e.g., in connection with an audit of a particular security policy) include both network-based and host-based scans of a particular portion of a computing environment, if possible.

Figure 4D:
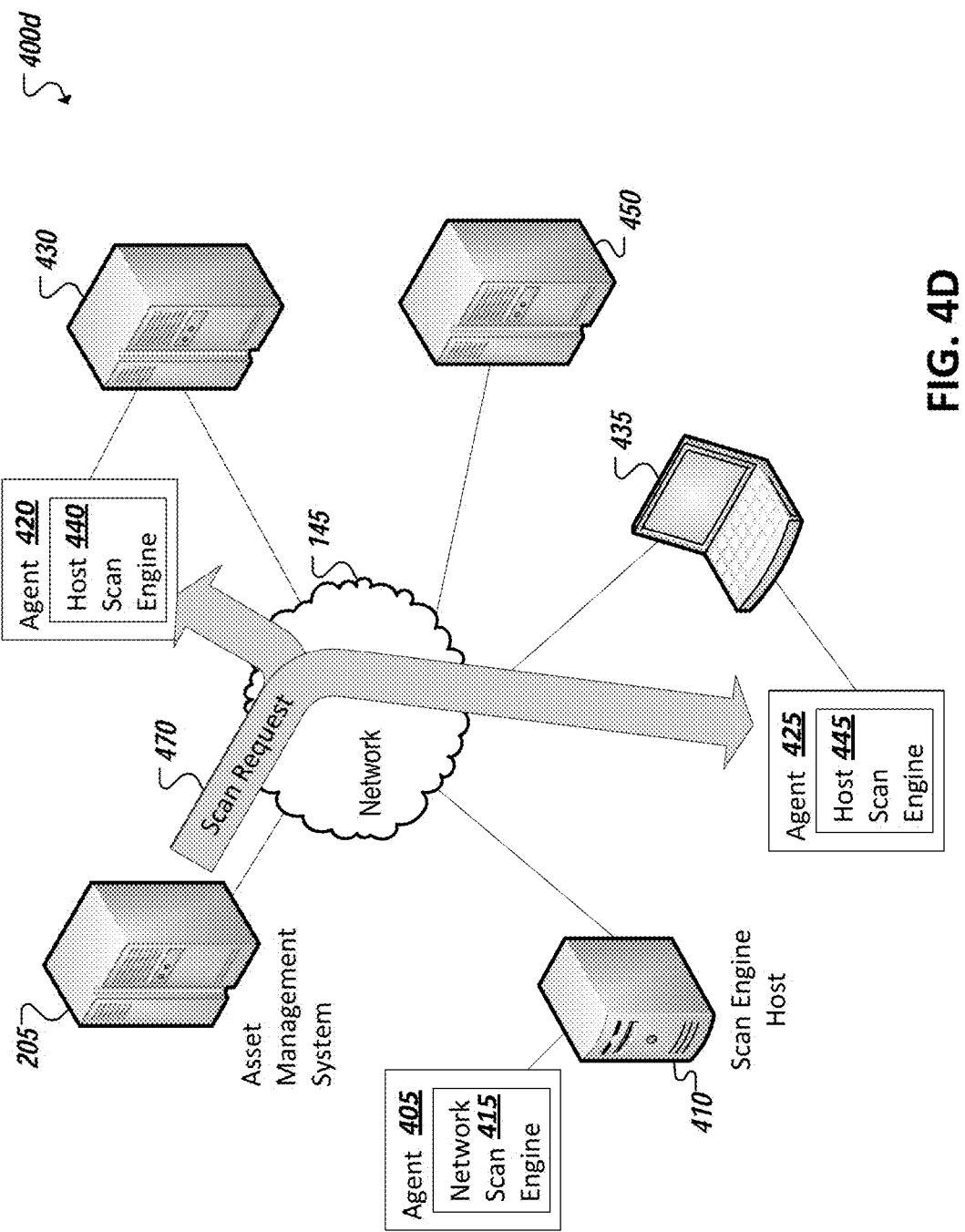

For instance, as shown in the example of FIG. 4D, in addition to (and/or in response to) network-based scans 460, asset management system 205 can send scan requests 470 to particular host-based scan engines 440, 445 of devices (e.g., 430, 435) determined to be targets of the corresponding host-based scans or scan tasks. Such scan requests 470 can be sent to the host-based scan engines 440, 445 through respective agents 420, 425 hosted on scan targets 430, 435. The respective agents 420, 425 can be instances of the same standardized agent (e.g., 405) used in scan host 410. In some instances, not all computing devices in a computing environment will have an agent or scan engine installed on the device (e.g., system 450), despite the devices being of interest to the overall security profile of the computing environment and targets of a particular scan set. In some instances, an asset management system 205 may be limited to causing scans to be performed on only "managed" devices (i.e., devices including an agent in communication with asset management system 205). In other instances, asset management system 205 can identify that a particular device is unmanaged (i.e., does not include an agent) and cause an agent and/or scan engine to be loaded onto the device in order to complete a host-based scan of the device. For instance, in some implementations, a dissolvable or otherwise temporary agent or scan engine can be deployed on a device (e.g., 450) identified as unmanaged to perform internal scans of the host device. In some instances, additional network-based scans (e.g., 460) may be performed to attempt to extract information from scan targets not possessing a host-based scan engine. In other instances, the asset management system 205 may determine that only some managed devices are to be scanned, proceed with scanning only those devices on which a host-based scan engine (whether agent-based or otherwise) is available, or elect to scan some other subset of relevant devices.

Figure 4E:
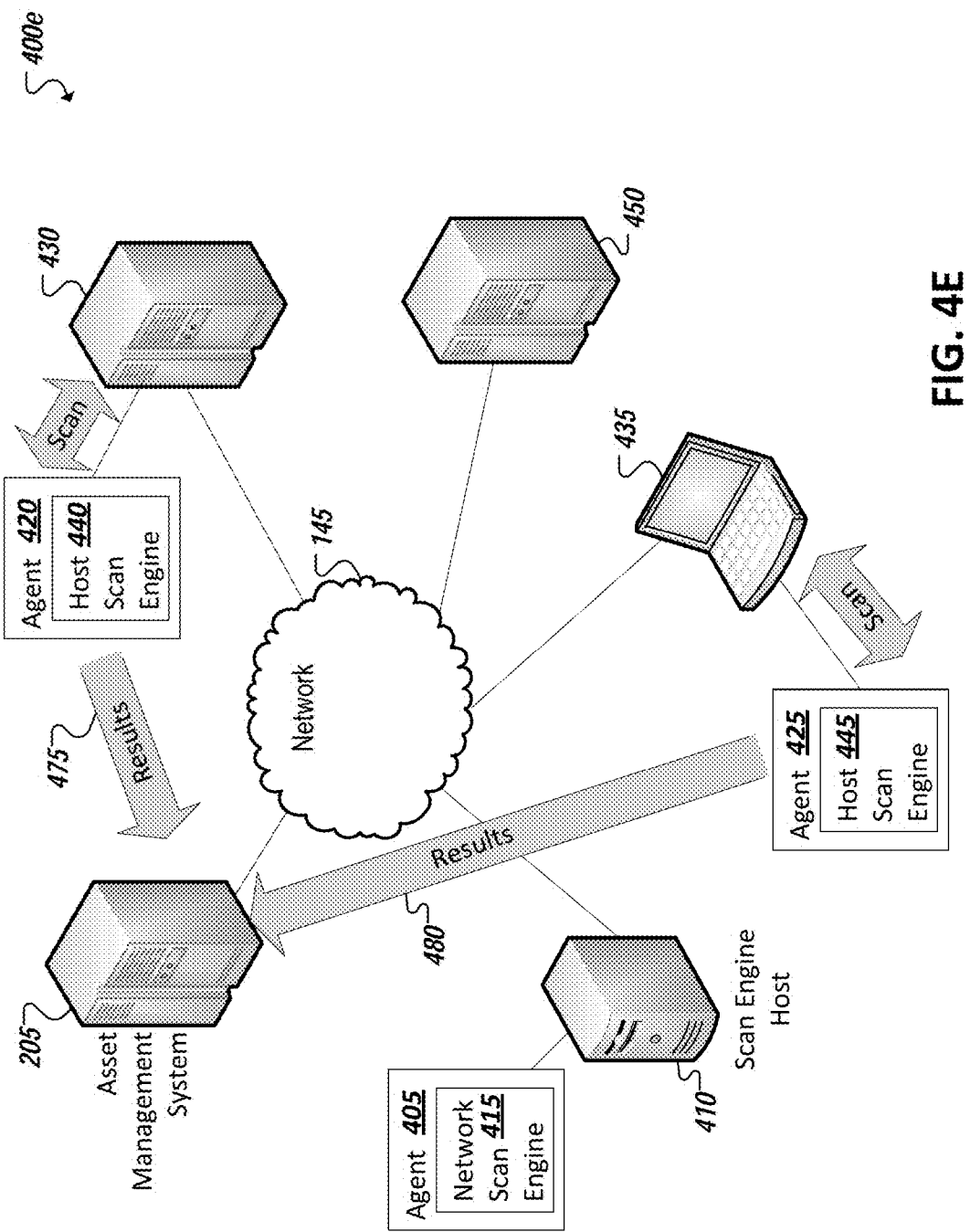

In response to scan requests 470, host-based scan engines 440, 445 can ping, inspect, challenge, test, or otherwise communicate with and access internal resources of their respective hosts (e.g., 430, 435) in accordance with scan scripts or other scan instructions included in scan requests 470 of asset management system 205. Further, scan results 475, 480 obtained through the host-based scans of hosts 430, 435 can each be communicated to asset management system 205, as shown in FIG. 4E. In the examples of FIGS. 4A-4E, multiple scans were completed, including both network-based and host-based scans, scans of various devices, and in some instances, scans of varying types, including scans utilizing different computing languages. A coherent strategy for such a set of scans can be produced and directed using an at least partially centralized asset management system 205, and results (e.g., 465, 475, 480) of the scan set (e.g., 460, 470) can be collectively communicated to the asset management system 205 to be aggregated and centrally processed to determine the results and conclusions of the scan set.

Further, redundant, over-inclusive, or others scans not in keeping with a particular goal for the scan (and potentially, unduly burdening resources of the computing environment) can be managed and kept to a minimum by an asset management system 205 through its management of the scan(s). For instance, in some implementations, as scan results (e.g., 465, 475, 480) are returned to an asset management system 205, the scan results can inform the asset management system 205 of the progress of the scans and, in some cases, cause the asset management system 205 to add, change, skip, or otherwise modify originally planned scans or scan sets. For instance, a scan result from a network-based scan of one or a plurality of hosts within a computing environment can affect (e.g., trigger, add, cancel, modify) another network-based scan of the same or other remote hosts. A scan result from a network-based scan can also be used to affect (e.g., trigger, add, cancel, modify) a host-based scan related (e.g., in the same scan set) managed by the asset management system 205, among other examples. Similarly, scan results of one or more host-based scans can be considered by the asset management system 205 to cause a change in other host-based and/or network-based scans managed by the asset management system 205. Such management by the asset management system 205 can be in addition to scan decision trees and other logic included in scan engines and scan scripts processed by the scan engines allowing the scan engines themselves to take certain actions in response to certain results or outputs detected by the scan engine during or prior to the execution of a particular scan.

Figure 5A:
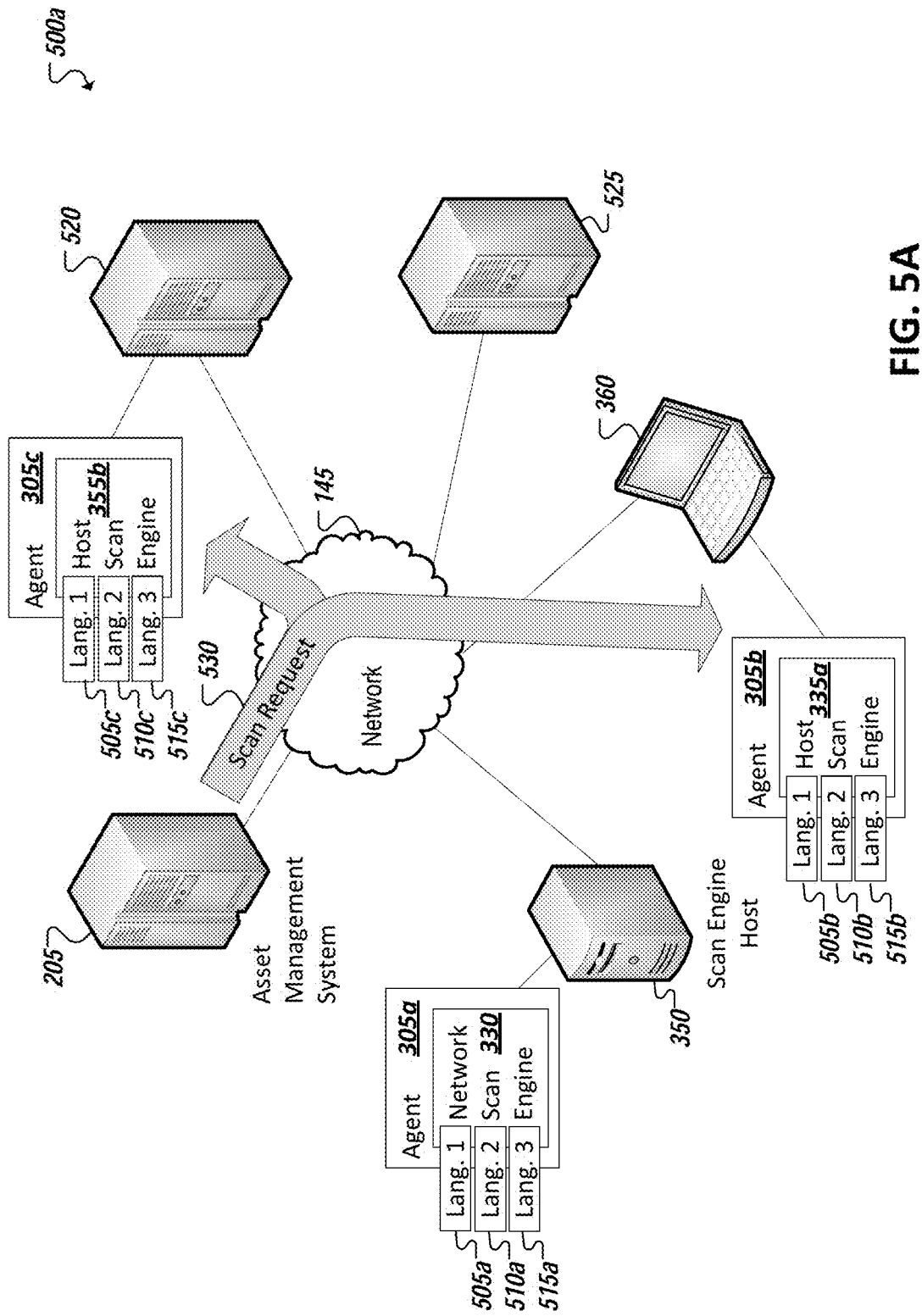
FIGS. 5A-5G are simplified block diagrams illustrating example operations of an example asset management system and example scan engines in accordance with at least one embodiment.

Turning to the examples of FIGS. 5A-5G, simplified block diagrams 500a-g are shown illustrating further example operations of an asset management system 205 and other implementations of agent-based scan engines. For instance, as noted above, in some implementations, unified scan engines (e.g., 330, 355a, 355b) can be used in connection with standardized agents (e.g., 305a, 305b, 305c) to perform particular scans of a computing environment as managed by an asset management system 205. As shown in the example of FIG. 5A, unified scan engines can include both network-based (e.g., 330) and host-based (e.g., 355a, 355b) scan engines. Further, each unified scan engine can include a library of available language interpreters (e.g., 505a-c, 510a-c, 515a-c) for use in customizing particular scan tasks performable using the scan engine based on the particular target (e.g., devices 360, 520, 525, etc.) of the scan. Language interpreters can include logic for interpreting a particular type of computing language to understand and execute scan scripts written in, produce outputs in, accept inputs in, or otherwise use the corresponding computing language.

As an example, as shown in FIG. 5A, asset management system 205 can generate or identify a particular scan or set of scans that first attempts to obtain, through host-based scans, particular desired information regarding particular scan targets. In other instances, scans can begin with network-based scans, perform a combination of network-based and host-based scans at least partially concurrently, utilize only host-based scans, only network-based scans, among other example scan sets. In the particular example of FIG. 5A, however, asset management system 205 can identify that agents 305b, 305c are installed on two (e.g., 360, 520) of three scan targets (e.g., 360, 520, 525) and further determine, through communication with agents 305b, 305c, that host-based unified scan engines 355a, 355b are included on the agents 305b, 305c and that host-based scans are available on the scan targets 360, 520. In some instances, the identification of scan engines 355a, 355b on host devices 360, 520 can be determined from a mapping of engines to hosts, an asset repository, or other data structure maintained by or otherwise available to asset management system 205.

Asset management system 205 can send scan requests 530 to scan engines 355a, 355b according to a particular scan set. The contents of scan requests can include particular scan scripts or other instructions, including scripts and instructions configured according to the particular attributes of the host-based scan engine's host device (e.g., 360, 520). For instance, scan requests 530 can be tailored to or based on known attributes of the host devices recorded, for instance, in an asset repository accessible to asset management system. In other instances, a substantially identical scan requests can be sent to each host-based scan engine 355a, 355b (e.g., through a respective agent 305b, 350c) to perform a substantially identical scan on each target. Further, upon receiving the respective scan request, host-based scan engines 355a, 355b can interpret the request, including identifying respective scan scripts included in the request, and based on the nature of requested scan, activate one or more language interpreters (e.g., 505b-c, 510b-c, 515b-c) corresponding to one or more computing languages to be used in the requested scans. In some instances, the corresponding language interpreters (e.g., 505b-c, 510b-c, 515b-c) can be identified within the scan request (e.g., 530) itself.

Figure 5B:
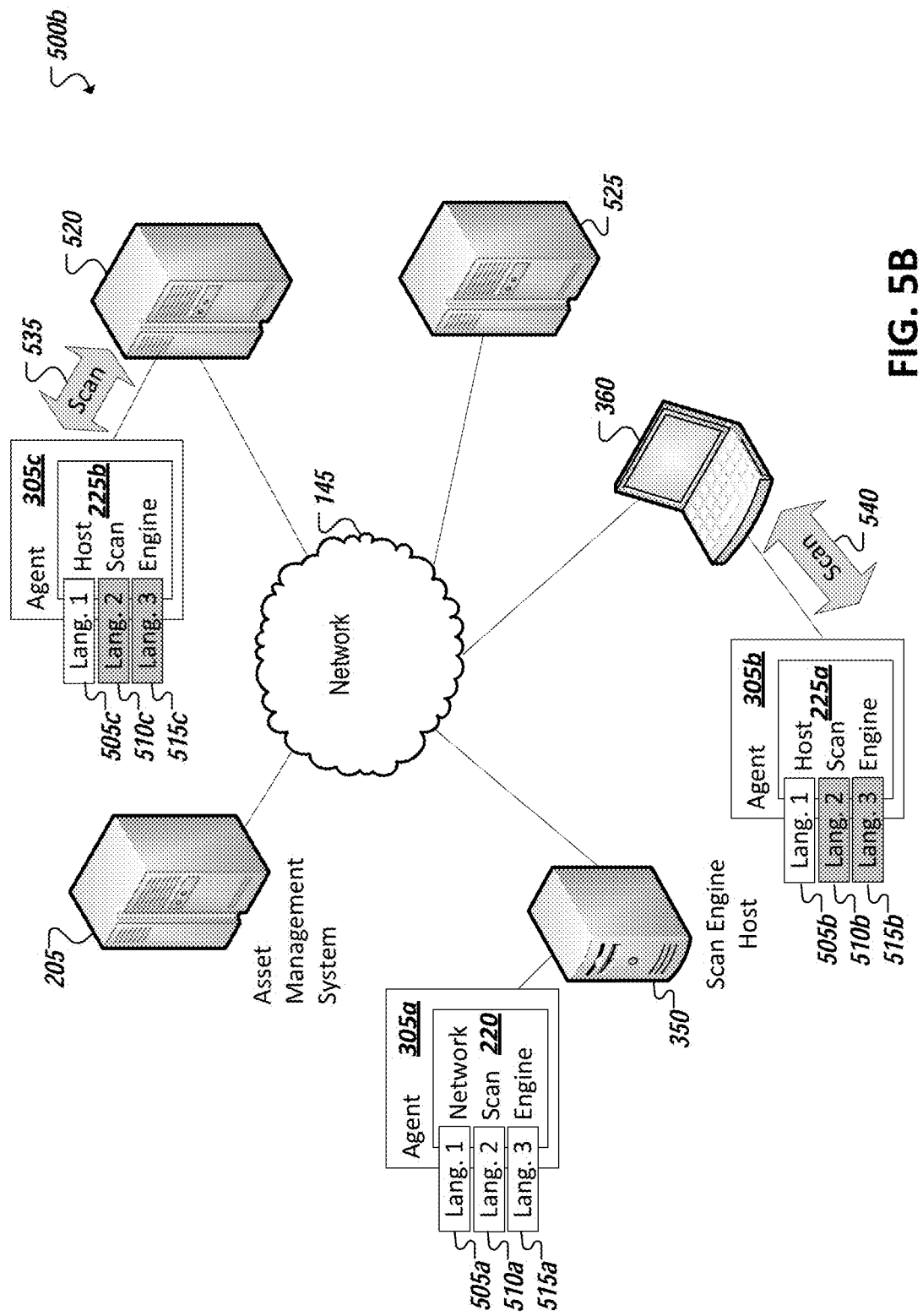

Turning to FIG. 5B, in one particular example, each of host-based scan engines 355a, 355b can activate two language interpreters 510b, 510c and 515b, 515c based on one or more scans requested by asset management system 205 in scan requests 530. In the representations of the examples of FIGS. 5A-5G, activated language interpreters are shown as shaded (e.g., 510b, 510c, 515b, 515c), while inactive language interpreters are shown unshaded (e.g., 505a-c, 510a, 515a). In some implementations, when a language interpreter is inactive it is locked, with only a scan request (or included scan script) from the asset management system 205 able to (temporarily) unlock the language interpreter for use by the scan engine during the corresponding scan. In such instances, the scan engine may be otherwise unable to activate, access, and use language interpreters included in its own library of language interpreters. This can be useful, for instance, in protecting access to particular licensed, proprietary, or other functionality embodied in scans and scan scripts, limiting the ability of developers to work-around an asset management system 205 to utilize unified scan engines to reproduce (without authorization) particular licensed or proprietary scans, among other examples.

Figure 5C:
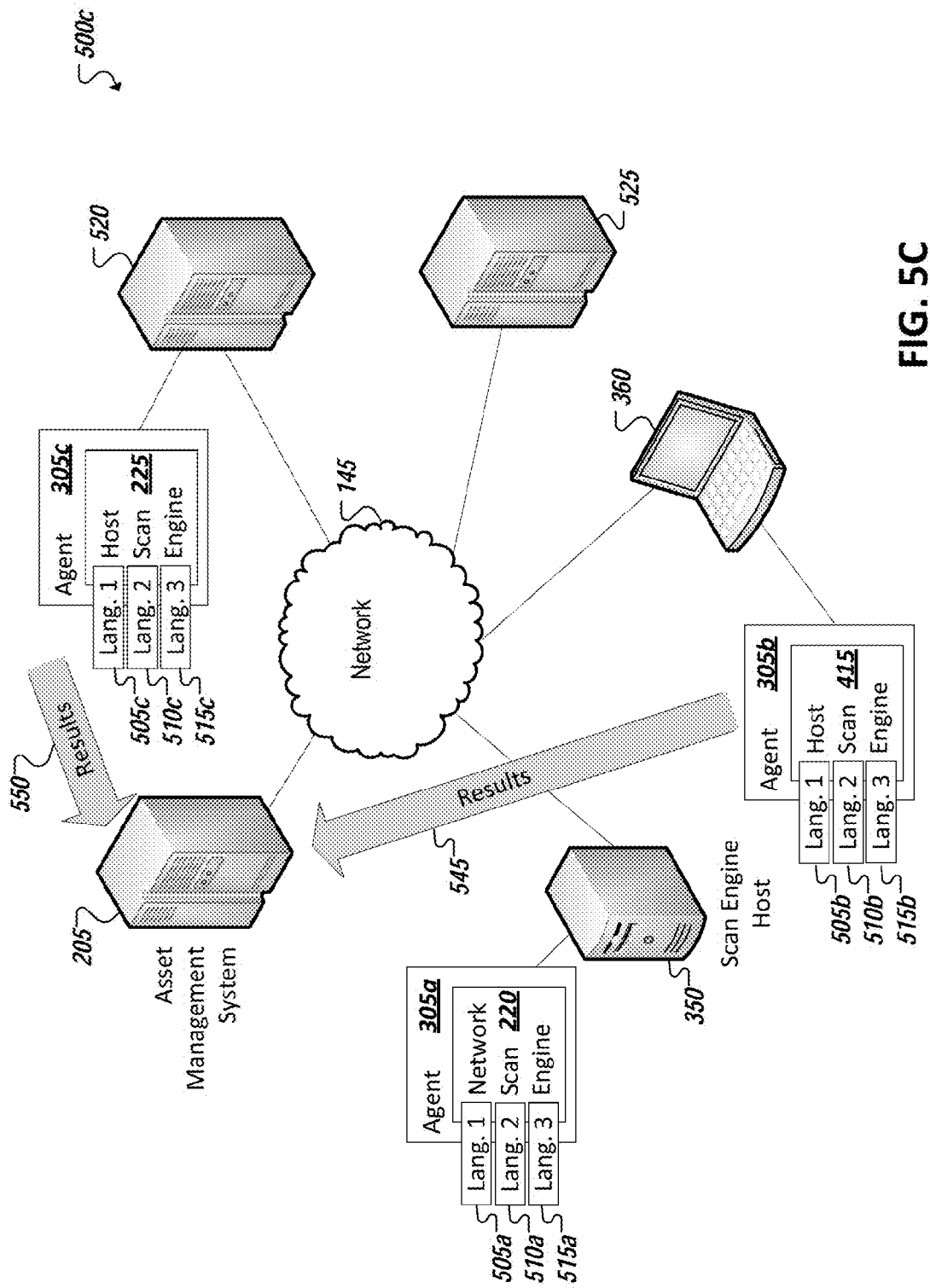

With the appropriate language interpreters (e.g., 510b, 510c, 515b, 515c) activated, host-based unified scan engines 355a, 355b can perform the requested scans (e.g., 535, 540) on their respective hosts 360, 520 to identify information and data of various resources of the scanned host. The discovered data and information can then be included in scan results (e.g., 545, 550) sent by each host-based scan engine 355a, 355b to the asset management system 205, as illustrated in the example of FIG. 5C. In this particular example, asset management system 205 can inspect the scan results 545, 550 returned by scan engines 355a, 355b to determine whether the scans were successful in obtaining the information intended from the scans. If the information was successfully obtained (e.g., providing answers to certain questions concerning the security status of one or more resources or devices of the computing environment), then the asset management system 205 can conclude the scanning. If, however, the scans were somehow deficient in obtaining the desired information, additional scans can be initiated by the asset management system 205 to attempt to obtain the information. For instance, in the example of FIGS. 5A-5C, no agent or host-based scan engine may be available for a host-based scan of scan target 525, thereby resulting in a deficiency regarding information obtained for scan target 525. Additionally, or alternatively, scans 535, 540 may also have been unsuccessful in obtaining all of the information desired from the scan (or set of scans). Accordingly, additional scans can be requested or conditional scans in a scan set can be triggered to supplement the results of other scans in the scan set, including network-based scans based on the asset management system's analysis of scan results 545, 550, such as shown in the examples of FIGS. 5D-5G.

Figure 5D:
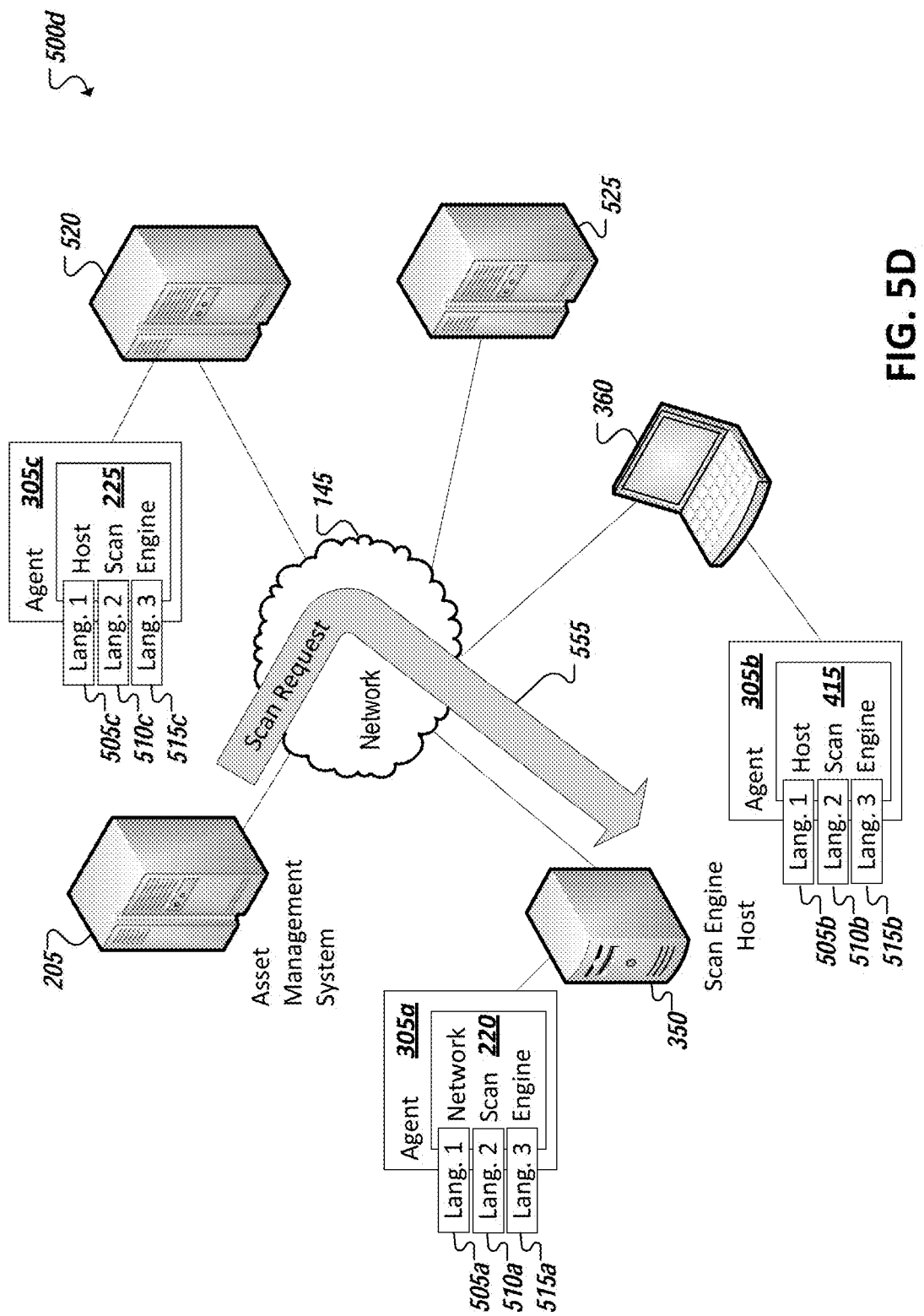
Figure 5E:
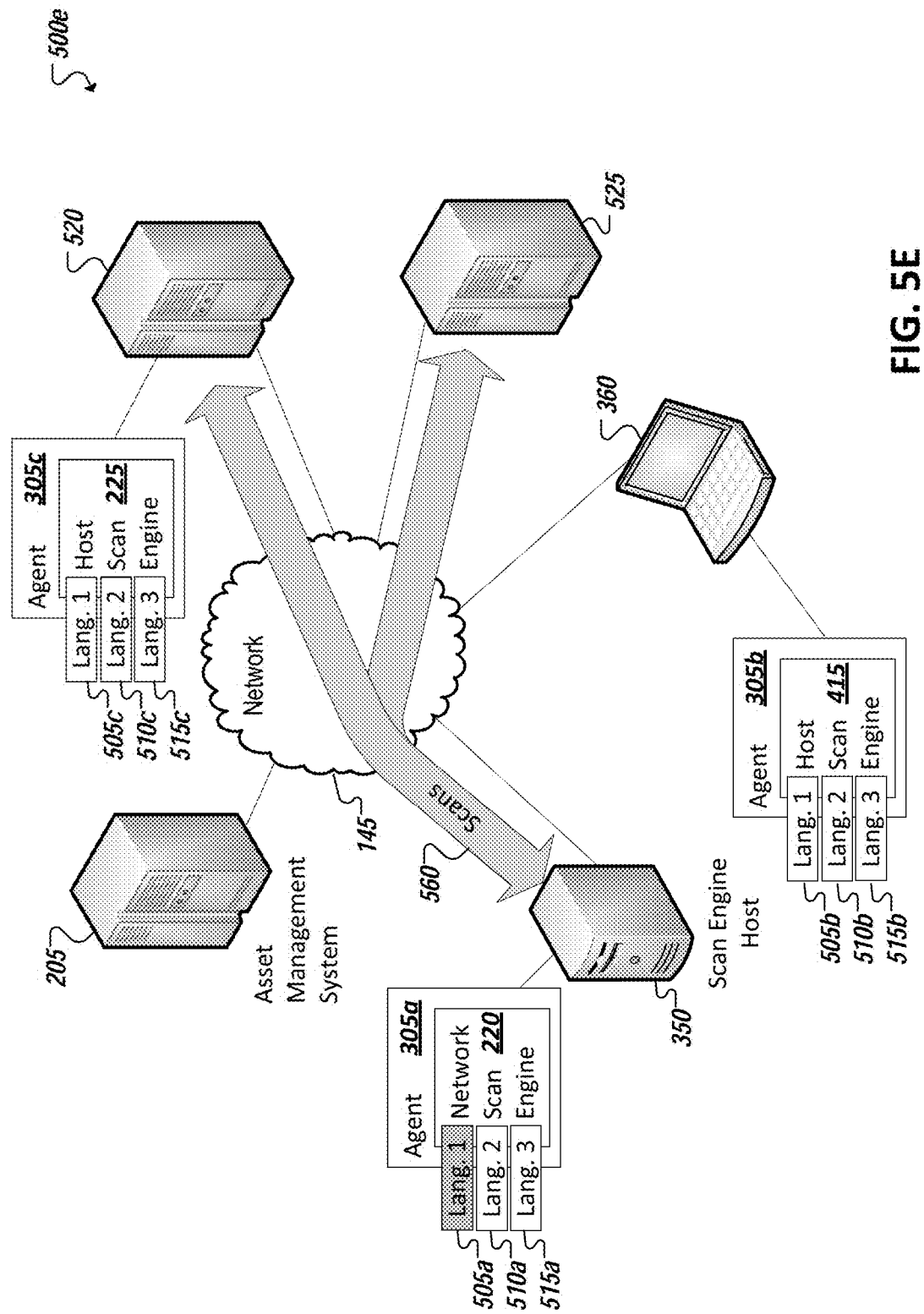

Turning to the example of FIG. 5D, one or more additional scan requests 555 can be sent to a network-based unified scan engine 220 hosted by scan engine host 350 on a standardized agent 305a. As in previous examples, a scan request 555 can include information directing the scan engine 220 to perform particular scans of the computing environment based, for instance, on the attributes of the various scan targets, the type of information to be scanned for, previous scan results (e.g., 545, 550), and so forth. The contents of the scan request 555 can be determined by the asset management system 205 so as to optimize scanning of the portion of the computing environment targeted in the scan while working to obtain a comprehensive and satisfactory set of scan results. For instance, in the particular example of FIG. 5D, an asset management system 205 can determine that additional network-based scans should be attempted to supplement information obtained in the host-based scans 540, 545. Turning to the example of FIGS. 5E and 5F, two distinct types of scans, each employing a different set of language interpreters, can be determined by the asset management system 205 for scanning hosts 520, 525 and user endpoint host 360, as an example. Accordingly, in order to perform network-based scans of host devices 520, 525, a first language interpreter 505a of network-based scan engine 220 can be identified (and activated) from a library of language interpreters, based on the scans requested in scan requests 555. Using the activated language interpreter 505a, network-based unified scan engine 220 can perform respective scans 560 of targeted host devices 520, 525 according to scan scripts or other scan instructions received in scan requests 555.

Figure 5F:
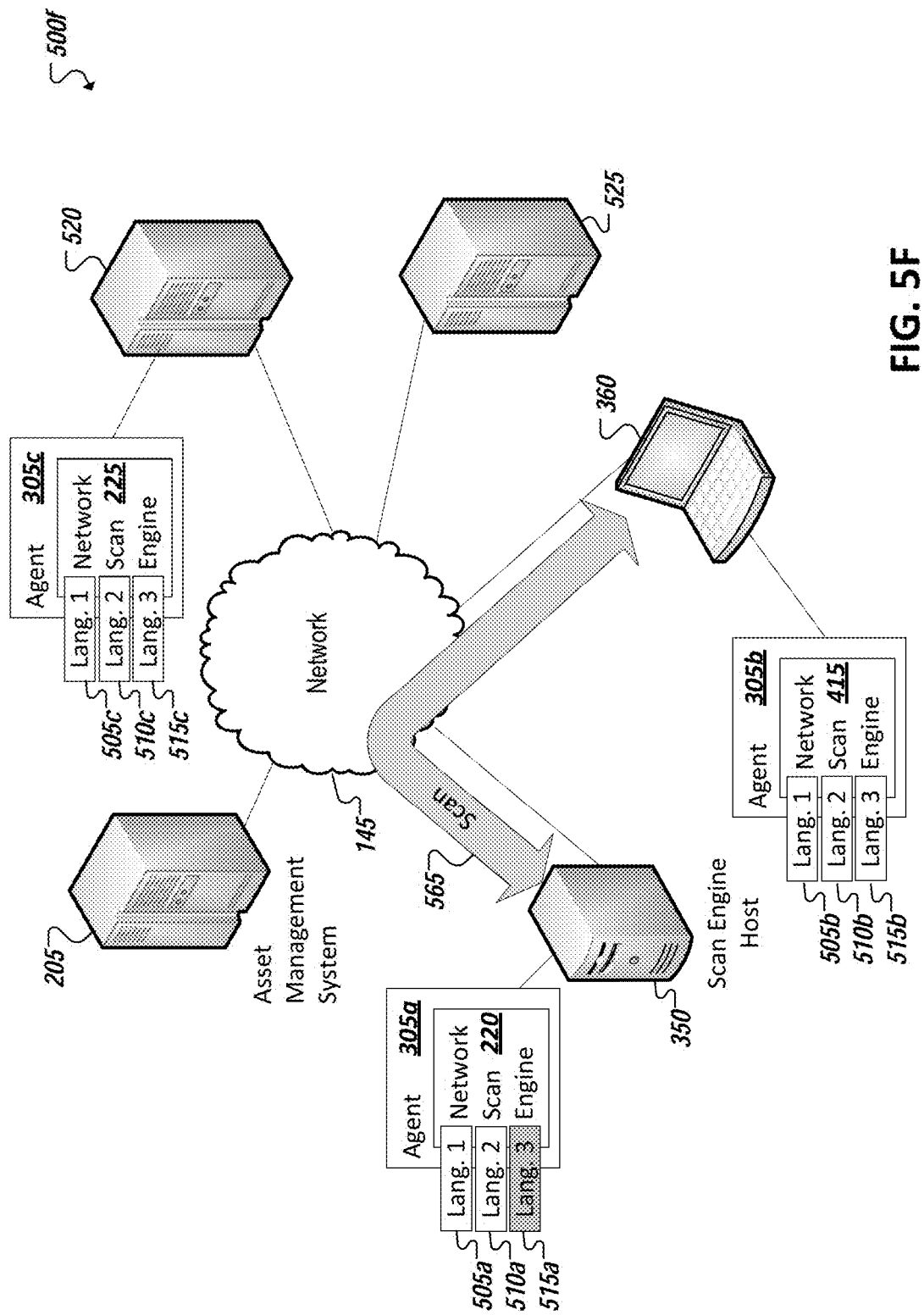
Figure 5G:
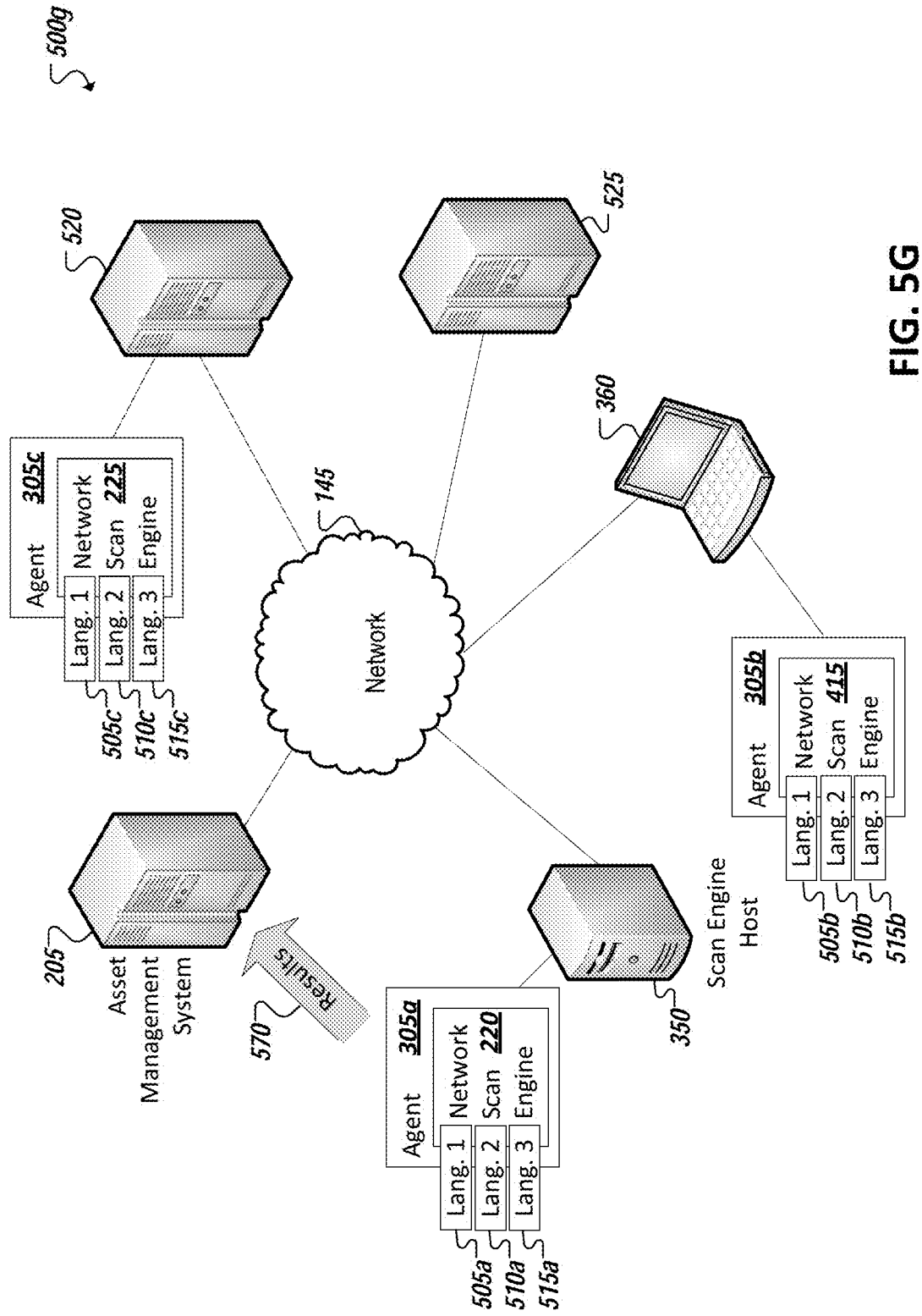

Further, as illustrated in FIG. 5F, a different type of scan 565 can be performed using the same network-based scan engine 220 but employing a different language interpreter (e.g., 515a) from the language interpreter used in the scans 560 of host devices 520, 525. In response to, or during, the network-based scans 560, 565 of host devices 360, 520, 525, information can be collected, for instance, using the respective language interpreter (e.g., 505a, 515a) employed in the scan to generate scan results 570 for forwarding to asset management system 205, as shown in FIG. 5G. Asset management system 205 can process scan results 570 obtained from network-based scans 560 with scan results 545, 550 of host-based scans 535, 540 to generate a cohesive set of scan results for the set of scans performed, for instance, in connection with auditing of a particular security policy for the computing environment. For instance, at least portions of a system can be governed by Payment Card Industry (PCI) Security policies, and auditing of the policies (in several policy categories), can be accomplished using a set of a plurality of scans, including both host-based and network-based scans, that can be run to audit various system assets' compliance with applicable PCI policies, among other examples.

It should be appreciated that the examples described and illustrated in connection with FIGS. 1-5G are non-limiting examples provided solely for purposes of illustrating various concepts addressed in this disclosure. For instance, techniques, operations, and system and component architectures can be adopted that are different from the example techniques, systems, and tools described above but that nonetheless apply at least some of the principles dealt with in this disclosure. For instance, in practice, a computing environment can include hundreds to thousands of various potential scan targets of a myriad of different types and configurations. A correspondingly diverse array of scans can be developed and maintained by an at least partially centralized asset management system for use by various scan engines in scanning all or a portion of the computing environment, including even a single component of the computing environment. Given this diversity, it can be advantageous to adopt scan engines with a unified scan engine architecture enabling flexibility in performing the wide array of scans that may be desired for a computing environment. Such advantages (and others) notwithstanding, it should be appreciated that an asset management system can manage scans utilizing only traditional scan engines, only unified scan engines, or a mix of traditional scan engines and unified scan engines, as well as scan engines interfacing with the asset management system via an agent or other solutions. Additionally, it should be appreciated that a wide array of language interpreters can be used in connection with language interpreter libraries of unified scan engines and include language interpreters beyond the simplified and limited set of language interpreters mentioned in connection with the Figures and elsewhere in this disclosure.

Turning to FIGS. 6A-6B, simplified flowcharts 600a-b are shown illustrating example techniques relating to the scanning of hosts and other resources within a computing environment. For instance, in the example of FIG. 6A, a particular scan set including one or more scans can be identified 605, for instance, by an asset management system. The one or more scans of the particular scan set can be scans of all or a portion of a particular computing environment, including scans of one or more particular computing devices within the computing environment. One or more scan engines in a plurality of scan engines can be identified 610 that are able to perform the scans of the particular scan set. Scan engines can be identified 610 that possess both the functionality to perform a respective scan as well as access resources of a particular scan target within the particular portion of the computing environment to be scanned. The plurality of scans can include both host-based and network-based scans. Scan requests can be sent 615, for instance, from the asset management system to the identified one or more scan engines requesting that particular scan engines in the one or more scan engines perform a respective one or more of the scans in the scan set. The scan engines can perform the scans and return scan results, for instance, to an at least partially centralized asset management system, among other examples.

Turning to FIG. 6B, performance of a scan can include the use of a scan engine, such as a network-based or host-based unified scan engine. A scan request can be received 625 by a particular scan engine in a plurality of scan engines (e.g., identified (e.g., at 610) by an asset management system managing a set of scans) to perform one or more scans in a set of scans. One or more language interpreters in a plurality of language interpreters on the scan engine can be identified 630 for performing the requested scan(s). The language interpreters can be identified from or based on the received (at 625) scan request. Using the identified language interpreter, the scan engine can perform 635 the requested scan and return 640 the results, for instance, to an asset management system. Additional scans in the scan set can also be requested of and performed by the scan engine (or other scan engines in the plurality), including scans utilizing different language interpreters in the plurality of language interpreters and scans requested in response to received (e.g., at 640) scan results of other scans in the scan set, among other examples.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. In one alternative system or tool, the wireless authentication functionality of a simplified mobile communication device can be employed on a removable storage device, such as a portable hard drive, thumb drive, or the like. In such instances, the removable storage device can lack a user interface but possess wireless access functionality for connecting to cooperating computing devices over a short-range network, such as Bluetooth, and sharing authentication data with the cooperating computing devices over the short-range network to authenticate the holder of the wireless, portable storage device to one or more cooperating computing devices, allowing the user to both gain access to (and secure) the cooperating computing device through the wireless storage device as well as access, consume, and modify data stored on the hard drive using the authenticated-to cooperating computing device. Other systems and tools can also make use of principles of this disclosure. Additionally, diverse user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, loadbalancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, the instructions when executed on a machine, cause the machine to:
   identify a particular scan set to be performed on at least a portion of a computing environment, wherein the particular scan set comprises a plurality of scans and is to assess a particular policy of the computing environment;
   determine a set of scan engines, in a plurality of scan engines, to perform the plurality of scans, wherein the set of scan engines comprises two or more different scan engines, and identifying the set of scan engines comprises identifying, for each of the plurality of scans, a respective scan engine in the plurality of scan engines operable to perform the scan on one or more host devices in the computing environment;
   send a first request to a first one of the scan engines in the set of scan engines to perform at least one particular scan in the particular scan set, wherein the first scan engine is a network-based scan engine remote from the portion of the computing environment;
   receive scan result data from the first scan engine identifying results of the particular scan; and
   send a second request to a second-scan engine in the set of scan engines to perform at least one other scan based on results of the particular scan, wherein the second scan engine comprises a host-based scan engine hosted on a particular device in the portion of the computing environment and is to perform internal scans of the particular device, the second request indicates at least a portion of the results of the particular scan, and the other scan comprises a particular internal scan of the particular device using at least a portion of the results of the particular scan.

2. The storage medium of claim 1, wherein at least one of the first and second requests is sent through an agent.

3. The storage medium of claim 1, wherein network-based scan engines are to perform external scans of the portion of the computing environment.

4. The storage medium of claim 1, wherein a particular computing language in a plurality of computing languages is capable of being identified from the request by the first scan engine, and the scan engine is to access a corresponding language interpreter in a plurality of language interpreters on the first scan engine to perform the particular scan in the scan set.

5. The storage medium of claim 4, wherein the request causes the particular language interpreter to be temporarily activated on the first scan engine during the at least one scan in the scan set.

6. The storage medium of claim 1, wherein the instructions, when executed, further cause the machine to:
   send a request to a second one of the set of scan engines to perform another scan in the scan set, wherein scan result data is also received from the second scan engine corresponding to the other scan in the scan set.

7. The storage medium of claim 6, wherein the instructions, when executed, further cause the machine to aggregate received scan result data corresponding to each scan in the scan set.

8. The storage medium of claim 6, wherein the second scan engine is a host-based scan engine hosted on a device in the portion of the computing environment and the other scan comprises an internal scan of the particular target device.

9. The storage medium of claim 6, wherein the request to the second scan engine to perform the other scan is sent in response to the scan result data received from the first scan engine corresponding to the particular scan.

10. The storage medium of claim 1, wherein the particular scan set is based, at least in part, on a security policy of the computing environment applicable to the portion of the computing environment.

11. The storage medium of claim 10, wherein identifying the particular scan set includes generating the particular scan set based on the security policy.

12. The storage medium of claim 10, wherein the security policy is one of device-centric policy, an organization-specific policy, and a regulatory policy.

13. The storage medium of claim 1, wherein the at least a portion of the computing environment includes the entire computing environment.

14. The storage medium of claim 1, wherein the particular scan engine is identified as operable to also perform a second scan in the particular scan set different from the particular scan, and the instructions, when executed, further cause the machine to:
    send a request to the first scan engine to perform the second scan; and
    receive scan results data from the first scan engine corresponding to the second scan.

15. The storage medium of claim 14, wherein the second scan involves a different scan target than the particular scan.

16. The storage medium of claim 14, wherein the second scan is a different type of scan from the particular scan.

17. The storage medium of claim 16, wherein the particular scan utilized a particular computing language and the second scan utilizes a different computing language than the particular scan.

18. The storage medium of claim 1, wherein the instructions, when executed, further cause the machine to:
    identify a second scan set different from the particular scan set to be performed on at least a portion of the computing environment;
    determine another set of scan engines in the plurality of scan engines to perform scans in the second scan set; and
    request scan engines in the other set of scan engines to perform the scans in the second scan set; and
    receive scan result data for the second scan set from corresponding scan engines in the other set of scan engines.

19. The storage medium of claim 18, wherein the first scan engine is also included in the other set of scan engines.

20. A method comprising:
    identifying a particular scan set to be performed on at least a portion of a computing environment, wherein the particular scan set comprises a plurality of scans and is to assess a particular policy of the computing environment;
    determining a set of scan engines, in a plurality of scan engines, to perform the plurality of scans, wherein the set of scan engines comprises two or more different scan engines, and identifying the set of scan engines comprises identifying, for each of the plurality of scans, a respective scan engine in the plurality of scan engines operable to perform the scan on one or more host devices in the computing environment;
    sending a first request to a first one of the scan engines in the set of scan engines to perform at least one particular scan in the particular scan set, wherein the first scan engine is a network-based scan engine remote from the portion of the computing environment;
    receiving scan result data from the first scan engine identifying results of the particular scan; and
    sending a second request to a second-scan engine in the set of scan engines to perform at least one other scan based on results of the particular scan, wherein the second scan engine comprises a host-based scan engine hosted on a particular device in the portion of the computing environment and is to perform internal scans of the particular device, the second request indicates at least a portion of the results of the particular scan, and the other scan comprises a particular internal scan of the particular device using at least a portion of the results of the particular scan.

21. A system comprising:
    at least one processor device;
    at least one memory element; and
    an asset management system server, adapted when executed by the at least one processor device to:
        identify a particular scan set to be performed on at least a portion of a computing environment, wherein the particular scan set comprises a plurality of scans and is to assess a particular policy of the computing environment;
        determine a set of scan engines, in a plurality of scan engines, to perform the plurality of scans, wherein the set of scan engines comprises two or more different scan engines, and identifying the set of scan engines comprises identifying, for each of the plurality of scans, a respective scan engine in the plurality of scan engines operable to perform the scan on one or more host devices in the computing environment;
        send a first request to a first one of the scan engines in the set of scan engines to perform at least one particular scan in the particular scan set, wherein the first scan engine is a network-based scan engine remote from the portion of the computing environment;
        receive scan result data from the first scan engine identifying results of the particular scan; and
        send a second request to a second-scan engine in the set of scan engines to perform at least one other scan based on results of the particular scan, wherein the second scan engine comprises a host-based scan engine hosted on a particular device in the portion of the computing environment and is to perform internal scans of the particular device, the second request indicates at least a portion of the results of the particular scan, and the other scan comprises a particular internal scan of the particular device using at least a portion of the results of the particular scan.

22. The system of claim 21, further comprising the plurality of scan engines, the plurality of scan engines further comprising at least one host-based scan engine and the set of scan engines is determined to include the host-based scan engine.

23. The system of claim 22, wherein each scan engine in the plurality of scan engines is a unified scan engine adapted to make use of a respective library of language interpreters included on the respective unified scan engine.

* * * * *